US012047300B2

(12) United States Patent
Chen et al.

(10) Patent No.: US 12,047,300 B2
(45) Date of Patent: Jul. 23, 2024

(54) PACKET FORWARDING METHOD, DEVICE, AND SYSTEM

(71) Applicant: Huawei Technologies Co., Ltd., Shenzhen (CN)

(72) Inventors: Lihao Chen, Beijing (CN); Tongtong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 17/707,313

(22) Filed: Mar. 29, 2022

(65) Prior Publication Data

US 2022/0224653 A1 Jul. 14, 2022

Related U.S. Application Data

(63) Continuation of application No. PCT/CN2020/116013, filed on Sep. 17, 2020.

(30) Foreign Application Priority Data

Sep. 30, 2019 (CN) .......................... 201910937790.9
Nov. 1, 2019 (CN) .......................... 201911057482.3

(51) Int. Cl.
*H04L 1/00* (2006.01)
*H04L 47/283* (2022.01)
*H04L 47/56* (2022.01)
(52) U.S. Cl.
CPC ............ *H04L 47/283* (2013.01); *H04L 47/56* (2013.01)
(58) Field of Classification Search
CPC .............................. H04L 47/283; H04L 47/56
See application file for complete search history.

(56) References Cited

U.S. PATENT DOCUMENTS 8,477,616 B1   7/2013 Rogers et al.
10,367,596 B1* 7/2019 Lu ....................... H04J 14/0212
(Continued)

FOREIGN PATENT DOCUMENTS

CN   102299788 A   12/2011
CN   104620548 A   5/2015
(Continued)

OTHER PUBLICATIONS

Chen Shuang et al., Load Balancing for Deterministic Networks, 2020 IFIP Networking Conference (Networking), Jun. 22, 2020, 6 pages.
(Continued)

*Primary Examiner* — Abdelnabi O Musa
(74) *Attorney, Agent, or Firm* — Conley Rose, P.C.

(57) ABSTRACT

A packet forwarding method includes a first network device receiving a first message from a second network device via a second egress port of the second network device, where the first message measures a phase difference, and where the phase difference is a phase difference between a switching time of one of a plurality of first buffers of a first egress port of the first network device and a switching time of one of a plurality of second buffers of the second egress port of the second network device with a link delay taken into consideration. The first network device determines the phase difference based on the first message. Then, the first network device schedules, based on the phase difference, a second data packet sent via the first egress port.

26 Claims, 8 Drawing Sheets

(56) References Cited

U.S. PATENT DOCUMENTS

| | | | |
|---|---|---|---|
| 2004/0066781 A1* | 4/2004 | Shankar | H04L 12/4666 |
| | | | 370/389 |
| 2014/0071823 A1 | 3/2014 | Pannell | |
| 2017/0195248 A1* | 7/2017 | Florea | G06F 12/10 |
| 2017/0264556 A1 | 9/2017 | Varga et al. | |
| 2018/0059712 A1 | 3/2018 | Kazehaya et al. | |
| 2019/0045475 A1 | 2/2019 | Kasichainula | |
| 2021/0058943 A1* | 2/2021 | Lu | H04W 48/10 |

FOREIGN PATENT DOCUMENTS

| | | | |
|---|---|---|---|
| CN | 105553590 A | 5/2016 | |
| CN | 109787919 A | 5/2019 | |
| EP | 1004189 A1 | 5/2000 | |
| JP | 2018129661 A | 8/2018 | |
| KR | 101970715 B1 | 4/2019 | |
| WO | 9965197 A1 | 12/1999 | |

OTHER PUBLICATIONS 802.1AS-2011—IEEE Standard for Local and Metropolitan Area Networks "Timing and Synchronization for Time-Sensitive Applications in Bridged Local Area Networks," Mar. 30, 2011, 292 pages.

802.1Qbv-2015—IEEE Standard for Local and metropolitan area networks "Bridges and Bridged Networks—Amendment 25: Enhancements for Scheduled Traffic," Dec. 5, 2015, 57 pages.

802.1Qcc-2018—IEEE Standard for Local and Metropolitan Area Networks "Bridges and Bridged Networks—Amendment 31: Stream Reservation Protocol (SRP) Enhancements and Performance Improvements," Jun. 14, 2018, 208 pages.

802.1Qch-2017—IEEE Standard for Local and metropolitan area networks "Bridges and Bridged Networks—Amendment 29: Cyclic Queuing and Forwarding," May 18, 2017, 30 pages.

J. Falk et al, "Exploring Practical Limitations of Joint Routing and Scheduling for TSN with ILP," IEEE 24th International Conference on Embedded and Real-Time Computing Systems and Applications (RTCSA), Dec. 31, 2018, 11 pages.

* cited by examiner

PACKET FORWARDING METHOD, DEVICE, AND SYSTEM

CROSS-REFERENCE TO RELATED APPLICATIONS

This is a continuation of International Patent Application No. PCT/CN2020/116013 filed on Sep. 17, 2020, which claims priority to Chinese Patent Application No. 201910937790.9 filed on Sep. 30, 2019 and Chinese Patent Application No. 201911057482.3 filed on Nov. 1, 2019. All of the aforementioned patent applications are hereby incorporated by reference in their entireties.

TECHNICAL FIELD

This application relates to the field of communications technologies, and in particular, to a packet forwarding method, a device, and a system.

BACKGROUND

Audio Video Bridging (AVB) is a new Ethernet standard. The AVB related standards are developed by the AVB task group within the 802.1 working group of the Institute of Electrical and Electronics Engineers (IEEE). The AVB task group was officially renamed to the Time-Sensitive Networking (TSN) task group in 2012. TSN mainly relates to a Stream Reservation Protocol (SRP), a Precision Time Protocol (PTP), traffic shaping, and the like. The TSN can be applied to a network scenario, for example, the audio and video transmission field, the automobile control field, the industrial control field, and the commercial electronics field, with a low latency requirement or time-based synchronous data transmission.

The TSN technical standards can be divided into four parts: a data plane, a control plane, time synchronization, and reliability. Several scheduling algorithms, frame preemption mechanisms, and the like defined for the data plane are key technologies for the TSN to achieve deterministic delay characteristics. The several scheduling algorithms can be divided into two categories: scheduling based on time gating (or synchronous scheduling), and scheduling based on quality of service (QoS) (which does not need to be based on time gating or asynchronous scheduling). The work of the control plane is to perform related configurations such as resource reservation for a network device based on requirements of a TSN service flow, so as to support the work of the TSN data plane.

IEEE 802.1Qbv defines a basic mechanism of scheduling based on time gating. On the basis of Qbv, IEEE 802.1Qch further defines a Cyclic Queuing and Forwarding (CQF) mechanism: two or more buffers need to be deployed on an egress port of each node for round robin scheduling, and all nodes perform time synchronization, so that the buffers on the egress port of each node are the same in terms of round robin time and frequency.

The use of the CQF mechanism relies on the IEEE 802.1AS time synchronization protocol, which is a specific design based on the PTP in IEEE 1588. Therefore, in a network scenario that implements the CQF mechanism, precise time synchronization between all network devices increases the difficulty and costs of network deployment. In addition, accumulation of clock jitter in a communications link increases the implementation difficulty in precise time synchronization.

SUMMARY

In view of this, embodiments of this application provide a packet forwarding method, a device, and a system. A first network device determines a phase difference based on measurement information received from a second network device, where the phase difference is a phase difference between a switching time of one of a plurality of first buffers of a first egress port of the first network device and a switching time of one of a plurality of second buffers of a second egress port of the second network device with a link delay taken into consideration. The first network device schedules, based on the phase difference, a data packet that needs to be sent via the first egress port. In this way, the first network device and the second network device implement queuing and forwarding of data packets without time synchronization.

Technical solutions provided in the embodiments of this application are as follows.

According to a first aspect, a packet forwarding method is provided, where the method includes receiving, by a first network device, a first message sent by a second network device via a second egress port of the second network device, where the first message is used to measure a phase difference, and the phase difference is a phase difference between a switching time of one of a plurality of first buffers of a first egress port of the first network device and a switching time of one of a plurality of second buffers of the second egress port of the second network device with a link delay taken into consideration, and determining, by the first network device, the phase difference based on the first message, where a switching cycle for the plurality of first buffers is the same as a switching cycle for the plurality of second buffers, and then scheduling, by the first network device based on the phase difference, a second data packet sent via the first egress port.

Based on the solution provided in this embodiment, the first network device and the second network device implement queuing and forwarding of data packets without time synchronization.

In a possible implementation of the first aspect, before determining, by the first network device, the phase difference based on the first message, the method further includes receiving, by the first network device, a second message sent by the second network device, where the second message includes a first time and a second time, the first time is a time at which the second network device sends the first message, the second time is a first switching time of a second buffer in the plurality of second buffers that is scheduled when the first message is sent, and the first switching time is earlier than the first time, and determining, by the first network device, the phase difference based on the first message further includes determining, by the first network device, the phase difference based on the first message and the second message.

Based on the solution provided in this embodiment, the first network device and the second network device improve the calculation precision of the phase difference through transfer of the first message and the second message.

In another possible implementation of the first aspect, before determining, by the first network device, the phase difference based on the first message, the method further includes receiving, by the first network device, a second message sent by the second network device, where the second message includes a first time difference, the first time difference is a difference between a first time and a second time, the first time is a time at which the second network device sends the first message, the second time is a first switching time of a second buffer in the plurality of second buffers that is scheduled when the first message is sent, and the first switching time is earlier than the first time, and determining, by the first network device, the phase difference based on the first message further includes determining, by the first network device, the phase difference based on the first message and the second message.

Based on the solution provided in this embodiment, the first network device and the second network device improve the calculation precision of the phase difference through transfer of the first message and the second message.

In still another possible implementation of the first aspect, determining, by the first network device, the phase difference based on the first message and the second message includes determining, by the first network device, a third time at which the first message is received, determining, by the first network device, a fourth time based on the third time, where the fourth time is a second switching time of a corresponding first buffer in the plurality of first buffers that is scheduled when the first message is received, and the second switching time is later than the third time, and determining, by the first network device, the phase difference, where a value of the phase difference is equal to a difference between the switching cycle for the plurality of first buffers and a first value, the first value is equal to a value returned by a modulo operation of a second value on the switching cycle for the plurality of first buffers, and the second value is equal to a sum of the difference between the first time and the second time and a difference between the fourth time and the third time.

Optionally, the first message includes a first time and a second time, the first time is a time at which the second network device sends the first message, the second time is a first switching time of a second buffer in the plurality of second buffers that is scheduled when the first message is sent, and the first switching time is earlier than the first time.

Optionally, the first message includes a first time difference, the first time difference is a difference between a first time and a second time, the first time is a time at which the second network device sends the first message, the second time is a first switching time of a second buffer in the plurality of second buffers that is scheduled when the first message is sent, and the first switching time is earlier than the first time.

In still another possible implementation of the first aspect, determining, by the first network device, the phase difference based on the first message includes determining, by the first network device, a third time at which the first message is received, determining, by the first network device, a fourth time based on the third time, where the fourth time is a second switching time of a corresponding first buffer in the plurality of first buffers that is scheduled when the first message is received, and the second switching time is later than the third time, and determining, by the first network device, the phase difference, where a value of the phase difference is equal to a difference between the switching cycle for the plurality of first buffers and a first value, the first value is equal to a value returned by a modulo operation of a second value on the switching cycle for the plurality of first buffers, and the second value is equal to a sum of the difference between the first time and the second time and a difference between the fourth time and the third time.

In still another possible implementation of the first aspect, scheduling, by the first network device based on the phase difference, a second data packet sent via the first egress port includes determining, by the first network device, a corresponding first buffer for the second data packet based on the phase difference and a processing delay, where the plurality of first buffers include the corresponding first buffer, and the processing delay is a delay that occurs in the process of determining, by the first network device, the second data packet based on the first data packet, storing, by the first network device, the second data packet in the corresponding first buffer, and in the first cycle that is after the second data packet is stored and in which the corresponding first buffer is scheduled by the first network device, sending, by the first network device, the second data packet via the first egress port.

According to a second aspect, a packet forwarding method is provided, where the method includes generating, by a second network device, a first message, where the first message is used to trigger a first network device to determine a phase difference, and the phase difference is a phase difference between a switching time of one of a plurality of first buffers of a first egress port of the first network device and a switching time of one of a plurality of second buffers of a second egress port of the second network device with a link delay taken into consideration, and then sending, by the second network device, the first message to the first network device via the second egress port of the second network device, where a switching cycle for the plurality of first buffers is the same as a switching cycle for the plurality of second buffers.

Based on the solution provided in this embodiment, the first network device and the second network device implement queuing and forwarding of data packets without time synchronization.

In a possible implementation of the second aspect, the method further includes generating, by the second network device, a second message, where the second message includes a first time and a second time, the first time is a time at which the second network device sends the first message, the second time is a first switching time of a second buffer in the plurality of second buffers that is scheduled when the first message is sent, and the first switching time is earlier than the first time, and sending, by the second network device, the second message to the first network device via the second egress port of the second network device.

Based on the solution provided in this embodiment, the first network device and the second network device improve the calculation precision of the phase difference through transfer of the first message and the second message.

In another possible implementation of the second aspect, the method further includes generating, by the second network device, a second message, where the second message includes a first time difference, the first time difference is a difference between a first time and a second time, the first time is a time at which the second network device sends the first message, the second time is a first switching time of a second buffer in the plurality of second buffers that is scheduled when the first message is sent, and the first switching time is earlier than the first time, and sending, by the second network device, the second message to the first network device via the second egress port of the second network device.

Based on the solution provided in this embodiment, the first network device and the second network device improve the calculation precision of the phase difference through transfer of the first message and the second message.

In the foregoing first or second aspect, optionally, the first message includes a first identifier for identifying the first message, the second message includes a second identifier for identifying the second message, and the first identifier corresponds to the second identifier.

In the foregoing first or second aspect, optionally, the first message is a cyclic offset measurement message (COMM).

In the foregoing first or second aspect, optionally, the second message is a cyclic offset follow-up message (COFM).

According to a third aspect, a first network device is provided. The first network device has a function of implementing behavior of the first network device in the foregoing method. The function may be implemented based on hardware, or may be implemented based on hardware executing corresponding software. The hardware or the software includes one or more modules corresponding to the foregoing function.

In a possible design, a structure of the first network device includes a processor and an interface, and the processor is configured to support the first network device to perform a corresponding function in the foregoing method. The interface is configured to support communication between the first network device and the second network device, and receive information or instructions in the foregoing method from the second network device. The first network device may further include a memory. The memory is configured to be coupled to the processor, and store program instructions and data that are necessary for the first network device.

In another possible design, the first network device includes a processor, a transmitter, a receiver, a random-access memory (RAM), a read-only memory (ROM), and a bus. The processor is separately coupled to the transmitter, the receiver, the RAM, and the ROM through the bus. When the first network device needs to run, a bootloader in a basic input/output system or an embedded system that is firmed in the ROM is used to boot a system to start, and boot the first network device to enter a normal running state. After entering the normal running state, the first network device runs an application program and an operating system in the RAM, so that the processor performs the method in any one of the first aspect or the possible implementations of the first aspect.

According to a fourth aspect, a first network device is provided. The first network device includes a main control board and an interface board, and may further include a switching board. The first network device is configured to perform the method in any one of the first aspect or the possible implementations of the first aspect. Further, the first network device includes modules configured to perform the method in any one of the first aspect or the possible implementations of the first aspect.

According to a fifth aspect, a first network device is provided. The first network device includes a controller and a first forwarding subdevice. The first forwarding subdevice includes an interface board, and may further include a switching board. The first forwarding subdevice is configured to perform a function of the interface board in the fourth aspect, and may further perform a function of the switching board in the fourth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a basic input/ output system or an embedded system that is firmed in the ROM is used to boot a system to start, and boot the controller to enter a normal running state. After entering the normal running state, the controller runs an application program and an operating system in the RAM, so that the processor performs a function of the main control board in the fourth aspect.

According to a sixth aspect, a computer storage medium is provided. The computer storage medium is configured to store a program, code, or instructions used by the foregoing first network device. When executing the program, the code, or the instructions, a processor or a hardware device may complete functions or steps of the first network device in the first aspect.

According to a seventh aspect, a second network device is provided. The second network device has a function of implementing behavior of the second network device in the foregoing method. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device to perform a corresponding function in the foregoing methods. The interface is configured to support communication between the second network device and the first network device, and send information or instructions in the foregoing method to the first network device. The second network device may further include a memory. The memory is configured to be coupled to the processor, and the memory stores program instructions and data that are necessary for the second network device.

In another possible design, the second network device includes a processor, a transmitter, a receiver, a RAM, a ROM, and a bus. The processor is separately coupled to the transmitter, the receiver, the RAM, and the ROM through the bus. When the second network device needs to run, a bootloader in a basic input/output system or an embedded system that is firmed in the ROM is used to boot a system to start, and boot the second network device to enter a normal running state. After entering the normal running state, the second network device runs an application program and an operating system in the RAM, so that the processor performs the method in any one of the second aspect or the possible implementations of the second aspect.

According to an eighth aspect, a second network device is provided. The second network device includes a main control board and an interface board, and may further include a switching board. The second network device is configured to perform the method in any one of the second aspect or the possible implementations of the second aspect. Further, the second network device includes a module configured to perform the method in any one of the second aspect or the possible implementations of the second aspect.

According to a ninth aspect, a second network device is provided. The second network device includes a controller and a second forwarding subdevice. The second forwarding subdevice includes an interface board, and may further include a switching board. The second forwarding subdevice is configured to perform a function of the interface board in the eighth aspect, and may further perform a function of the switching board in the eighth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a basic input/ output system or an embedded system that is firmed in the ROM is used to boot a system to start, and boot the controller to enter a normal running state. After entering the normal running state, the controller runs an application program and an operating system in the RAM, so that the processor performs a function of the main control board in the eighth aspect.

According to a tenth aspect, a computer storage medium is provided. The computer storage medium is configured to store a program, code, or instructions used by the foregoing second network device. When executing the program, the code, or the instructions, a processor or a hardware device may complete functions or steps of the second network device in the foregoing second aspect.

According to an eleventh aspect, a network system is provided. The network system includes a first network device and a second network device. The first network device is the first network device in the third aspect, the fourth aspect, or the fifth aspect, and the second network device is the second network device in the seventh aspect, the eighth aspect, or the ninth aspect.

According to the foregoing solution, in a communications network, the first network device determines a phase difference based on a message received from the second network device, where the first network device considers a link delay from the second network device to the first network device when determining the phase difference. Further, the first network device may schedule, based on the phase difference, a data packet sent via the first egress port of the first network device. In this way, the first network device and the second network device implement queuing and forwarding of data packets without time synchronization.

DESCRIPTION OF EMBODIMENTS

The following separately provides detailed descriptions by using specific embodiments.

Figure 1:
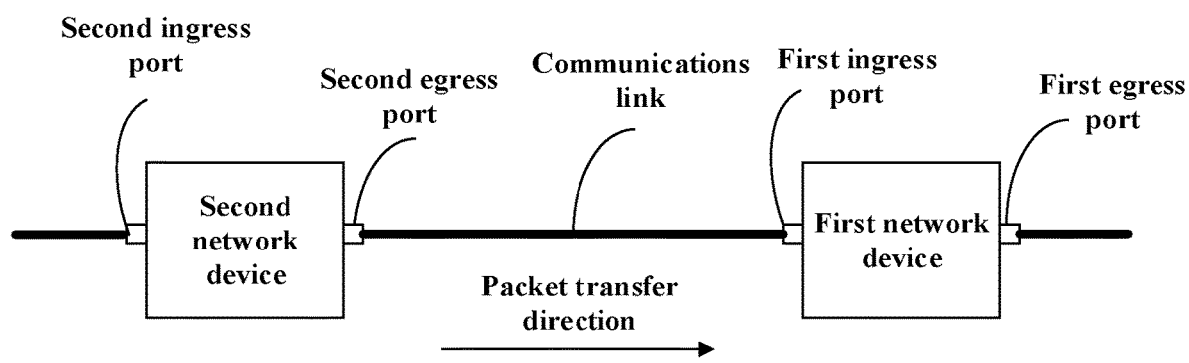
FIG. 1 is a schematic diagram of a structure of a communications network according to an embodiment of this application.

FIG. 1 is a schematic diagram of a structure of a communications network according to an embodiment of this application. As shown in FIG. 1, the communications network includes a first network device and a second network device. In a possible implementation, the communications network is a TSN in a fully distributed model. For a network architecture of the TSN in the fully distributed model, refer to the related explanation in "Clause 46. TSN Configuration" of IEEE 802.1Qcc-2018. In this implementation of this application, a packet transfer direction includes sending a packet from the second network device to the first network device. The second network device includes a second egress port. The first network device includes a first ingress port and a first egress port. The second egress port of the second network device and the first egress port of the first network device are connected via a communications link. The second network device may send a first packet to the first network device via the second egress port. After being transmitted via the communications link, the first packet reaches the first ingress port of the first network device. The first network device may receive the first packet via the first ingress port. After receiving the first packet, the first network device may process the first packet. Then, the first network device may send the processed first packet to a next-hop network device of the first network device via the first egress port. Optionally, the second network device may include a second ingress port. When the second network device includes the second ingress port, the second network device may receive, via the second ingress port, a second packet sent by a previous-hop network device of the second network device. Then, the second network device processes the second packet to obtain the corresponding first packet. The first network device and the second network device may be routers or switches. In this embodiment of this application, one communications link is used as an example for description. It should be understood that there may be a plurality of communications links between the first network device and the second network device. In other words, the first network device may include a plurality of first ingress ports, and the second network device may include a plurality of second egress ports.

Figure 2:
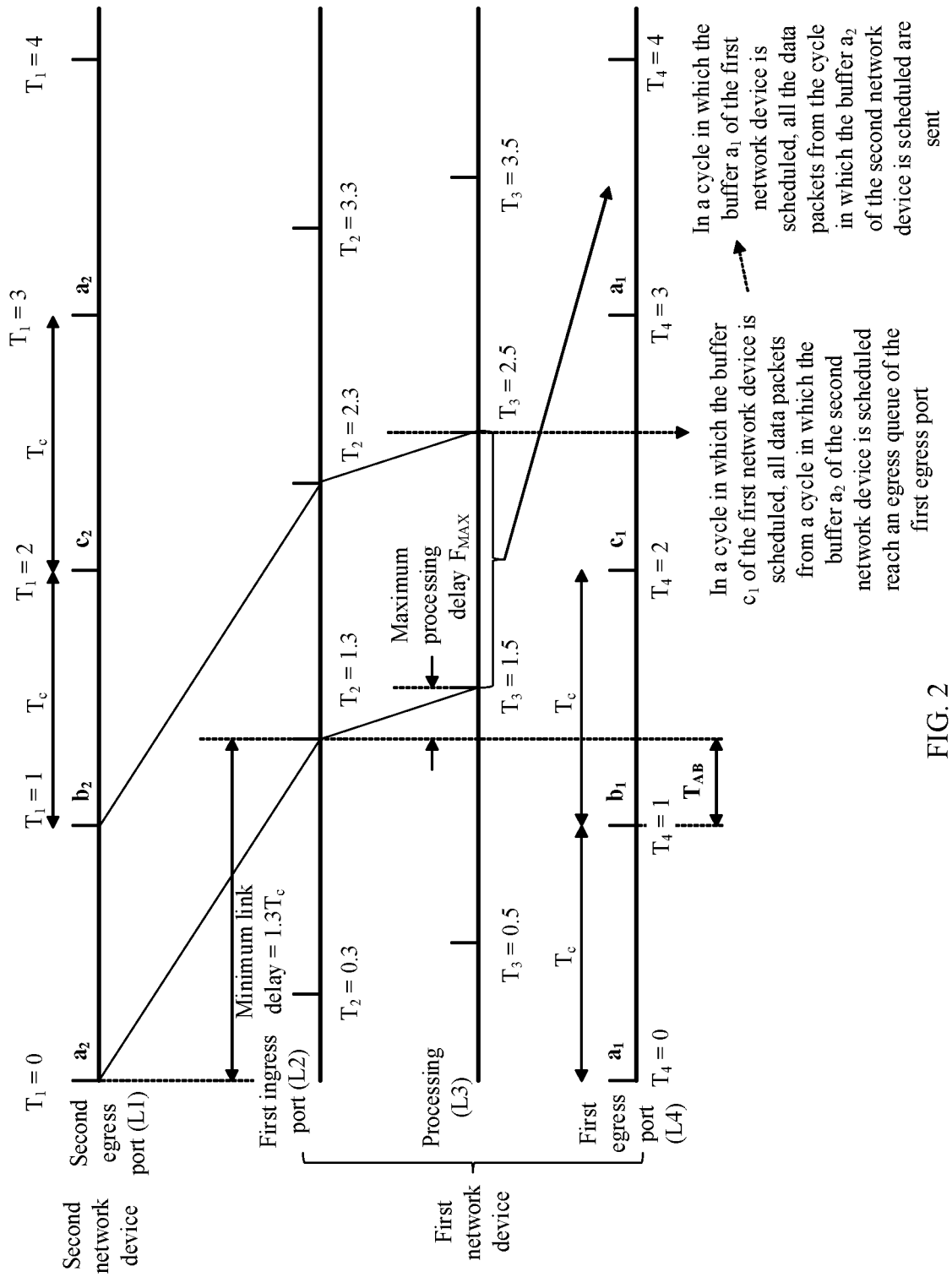
FIG. 2 is a schematic diagram of a packet forwarding process according to an embodiment of this application.

FIG. 2 shows, based on the network structure shown in FIG. 1, a process of transmitting a packet from the second network device to the first network device. As shown in FIG. 2, from top to bottom, a total of four horizontal long solid lines are shown, namely L1, L2, L3, and L4. L1 shows a packet dequeuing process at the second egress port of the second network device, L2 shows a packet queuing process at the first ingress port of the first network device, L3 shows a packet processing process inside the first network device, and L4 shows a packet dequeuing process at the first egress port of the first network device.

The second network device may set a plurality of buffers for the second egress port, and each of the plurality of buffers is configured to buffer a dequeued packet of the second egress port. Therefore, each of the plurality of buffers may be referred to as an egress port buffer. The plurality of buffers is cyclically scheduled by the second network device. For example, as shown by L1 in FIG. 2, the second network device sets three buffers, namely a buffer $a_2$, a buffer $b_2$, and a buffer $c_2$, for the second egress port. A cycle for which each buffer is scheduled by the second network device is the same and is $T_c$. Therefore, $T_c$ may be referred to as a switching cycle for the buffer $a_2$, the buffer $b_2$, and the buffer $c_2$. Further, in a cycle of $T_1=0$ to $T_1=1$, the second network device schedules the buffer $a_2$, sends out packets in the buffer $a_2$ from the second egress port, and sends out all the packets in the buffer $a_2$ (that is, empties a packet queue in the buffer $a_2$) before $T_1=1$. A time length of $T_1=0$ to $T_1=1$ is $T_c$. At $T_1=1$, the second network device switches the scheduled buffer from the buffer $a_2$ to the buffer $b_2$. Then, in a cycle of $T_1=1$ to $T_1=2$, the second network device schedules the buffer $b_2$, sends out packets in the buffer $b_2$ from the second egress port, and sends out all the packets in the buffer $b_2$ (that is, empties a packet queue in the buffer $b_2$) before $T_1=2$. A time length of $T_1=1$ to $T_1=2$ is $T_c$. At $T_1=2$, the second network device switches the scheduled buffer from the buffer $b_2$ to the buffer $c_2$. Then, in a cycle of $T_1=2$ to $T_1=3$, the second network device schedules the buffer $c_2$, sends out packets in the buffer $c_2$ from the second egress port, and sends out all the packets in the buffer $c_2$ (that is, empties a packet queue in the buffer $c_2$) before $T_1=3$. A time length of $T_1=2$ to $T_1=3$ is $T_c$. According to the foregoing description, the buffers set by the second network device are cyclically scheduled. Therefore, at $T_1=3$, the second network device switches the scheduled buffer from the buffer $c_2$ to the buffer $a_2$. Then, in a cycle of $T_1=3$ to $T_1=4$, the second network device schedules the buffer $a_2$, sends out packets in the buffer $a_2$ from the second egress port, and sends out all the packets in the buffer $a_2$ (that is, empties a packet queue in the buffer $a_2$) before $T_1=4$. A time length of $T_1=3$ to $T_1=4$ is $T_c$. By analogy, the buffer $a_2$, the buffer $b_2$, and a buffer $c_2$ can be cyclically scheduled. It should be understood that when a buffer is not scheduled by the second network device in a cycle, it does not mean that the buffer is not being used by the second network device. For example, in a cycle of $T_1=1$ to $T_1=3$, the buffer $a_2$ is not scheduled by the second network device, but during this time, the buffer $a_2$ may buffer packets so that the packets in the buffer $a_2$ are discharged the next time the buffer $a_2$ is scheduled by the second network device. For details, refer to the description of the subsequent implementations. In this implementation of this application, the unit of $T_1$ may include millisecond, microsecond, or nanosecond, which is not limited in this application. Moreover, the specific values of $T_1$ in the above description are example values. According to the above description, whenever a moment $T_1$ is reached, a buffer scheduled by the second network device is switched. Therefore, $T_1$ may be understood as a switching time of the buffer $a_2$, the buffer $b_2$, and the buffer $c_2$. In other words, as the switching time, $T_1$ may be considered as a start moment of scheduling of the buffer ($a_2$, $b_2$, or $c_2$), or may be considered as an end moment of scheduling of the buffer ($a_2$, $b_2$, or $c_2$).

The second network device sends a packet to the first network device via the second egress port. For example, within $T_c$ ($T_1=0$ to $T_1=1$) in which the second network device schedules the buffer $a_2$, the second network device sends a first data packet to the first network device via the second egress port. As shown in FIG. 2, an area formed by the two inclined connecting lines between L1 and L2 shows an interval in which the first data packet can be sent. To be specific, in this area, the first data packet is sent out by the second network device via the second egress port, and is received by the first network device via the first ingress port. For example, at $T_1=0$, the second network device starts to send the first data packet via the second egress port. Correspondingly, at $T_2=1.3$, the first network device can receive the first bit of data of the first data packet via the first ingress port. In an actual application scenario, to prevent interference and jitter between cycles in which different buffers are scheduled, and to ensure that data packets are sent and received in a cycle, each cycle in which each buffer is scheduled may further include a first idle cycle and a second idle cycle. A start moment of the first idle cycle is a start moment of the cycle in which each buffer is scheduled, and an end moment of the second idle cycle is an end moment of the cycle in which each buffer is scheduled. In the first idle cycle and the second idle cycle, the second network device does not send the packets in the buffer. The two inclined connecting lines are formed because a communications link between the second network device and the first network device has a link delay, such as "minimum link delay=$1.3T_c$" shown in FIG. 2. The link delay of the communications link may be obtained by using a plurality of methods. For example, the second network device and the first network device measure the link delay of the communications link based on the PTP. The minimum link delay may be understood as a minimum value obtained after a plurality of measurements of the link delay. In this implementation of this application, the link delay is not limited to the minimum link delay. For example, an average link delay may be used as the link delay, or a link delay obtained through a specific measurement may be used as the link delay. The value ($1.3T_c$) of the minimum link delay is an example for the convenience of description.

L2 of FIG. 2 shows a case of packet queuing at the first ingress port of the first network device. For example, the second network device sends the first data packet via the second egress port. The first network device receives the first data packet via the first ingress port. The first data packet enters a packet queue of the first network device, so that the first network device processes the first data packet. In L2 of FIGS. 2, $T_2=0.3$, $T_2=1.3$, $T_2=2.3$, and $T_2=3.3$ are determined based on $T_1$ and the minimum link delay. For example, first, there is a formula: $T_{2,\ offset}$=Minimum link delay mod $T_c$=$1.3T_c$ mod $T_c$=$0.3$. The first network device knows switching times corresponding to the first egress port, that is, specific moments of $T_4$. In addition, because the second network device and the first network device are synchronized in terms of time, the first network device can determine switching times corresponding to the second egress port of the second network device, that is, specific moments of $T_1$. The first network device determines each moment of $T_2$ based on $T_1$ and $T_{2,\ offset}$, for example: $T_2=T_1+T_{2,\ offset}$. Herein, mod is used to represent a modulo operation. With reference to the foregoing description, $T_2$ is determined based on $T_1$ and the minimum link delay. In this implementation of this application, $T_2$ is introduced for the convenience of describing a forwarding process of a data packet between the second network device and the first network device. In an actual scenario, the first network device does not care about the existence of $T_2$, that is, the first network device does not need to control or use $T_2$.

L3 of FIG. 2 shows a packet processing process inside the first network device. For example, after the first network device receives the first data packet via the first ingress port, the first network device processes the first data packet. In this implementation of this application, a specific operation of processing is not limited, and may include any form of operation. For example, the first network device updates a header of the first data packet, or the first network device updates a data payload of the first data packet, or the first network device uses the first data packet as a condition to generate a new data packet, or the first network device keeps the first data packet unchanged and only transparently transmits the first data packet. After the processing by the first network device, a second data packet is obtained. It should be understood that the second data packet may be the same as or different from the first data packet. In L3 of FIG. 2, $T_3=0.5$, $T_3=1.5$, $T_3=2.5$, and $T_3=3.5$ are determined based on $T_2$ and a maximum processing delay $F_{MAX}$. For example, there is a formula: $T_3=T_2+F_{MAX}$. The maximum processing delay may be understood as a maximum value obtained after a plurality of measurements of the processing delay. In this implementation of this application, the processing delay is not limited to the maximum link delay. For example, an average processing delay may be used as the processing delay, or a processing delay obtained through a specific measurement may be used as the processing delay. In this implementation of this application, $T_3$ is introduced for the convenience of describing a processing process of a data packet in the first network device. In an actual scenario, the first network device does not care about the existence of $T_3$, that is, the first network device does not need to control or use $T_3$.

As shown in FIG. 2, an area formed by the two inclined connecting lines between L2 and L3 shows a cycle in which the first data packet can be processed. To be specific, a data packet is received via the first ingress port within an interval from $T_2=1.3$ to $T_2=2.3$, correspondingly, the first network device completes corresponding processing within an interval from $T_3=1.5$ to $T_3=2.5$, and stores a processed data packet in a buffer (for example, a buffer $a_1$) of the first network device. For example, the first data packet is received via the first ingress port at $T_2=1.3$. After receiving the first data packet, the first network device processes the first data packet. Based on $F_{MAX}$, the first network device completes processing of the first data packet at $T_3=1.5$, to obtain the second data packet. Then, the first network device stores the second data packet in the buffer (for example, the buffer $a_1$) of the first network device.

L4 of FIG. 2 shows a process of packet dequeuing at the first egress port of the first network device. The first network device may set a plurality of buffers for the first egress port, and each of the plurality of buffers is configured to buffer a dequeued packet of the first egress port. Therefore, each of the plurality of buffers may be referred to as an egress port buffer. The plurality of buffers is cyclically scheduled by the first network device. As shown in L4 of FIG. 2, the first network device sets three buffers, namely a buffer $a_1$, a buffer $b_1$, and a buffer $c_1$, for the first egress port. A cycle for which each buffer is scheduled by the first network device is the same and is $T_c$. Therefore, $T_c$ may be referred to as a switching cycle for the buffer $a_1$, the buffer $b_1$, and the buffer $c_1$. Further, in a cycle of $T_4=0$ to $T_4=1$, the first network device schedules the buffer $a_1$, sends out packets in the buffer $a_1$ from the first egress port, and sends out all the packets in the buffer $a_1$ (that is, empties a packet queue in the buffer $a_1$) before $T_4=1$ is $T_c$. At $T_4=1$, the first network device switches the scheduled buffer from the buffer $a_1$ to the buffer $b_1$. Then, in a cycle of $T_4=1$ to $T_4=2$, the first network device schedules the buffer $b_1$, sends out packets in the buffer $b_1$ from the first egress port, and sends out all the packets in the buffer $b_1$ (that is, empties a packet queue in the buffer $b_1$) before $T_4=2$. A time length of $T_4=1$ to $T_4=2$ is $T_c$. At $T_4=2$, the first network device switches the scheduled buffer from the buffer $b_1$ to the buffer $c_1$. Then, in a cycle of $T_4=2$ to $T_4=3$, the first network device schedules the buffer $c_1$, sends out packets in the buffer $c_1$ from the first egress port, and sends out all the packets in the buffer $c_1$ (that is, empties a packet queue in the buffer $c_1$) before $T_4=3$. A time length of $T_4=2$ to $T_4=3$ is $T_c$. According to the foregoing description, the buffers set by the first network device are cyclically scheduled. Therefore, at $T_4=3$, the first network device switches the scheduled buffer from the buffer $c_1$ to the buffer $a_1$. Then, in a cycle of $T_4=3$ to $T_4=4$, the first network device schedules the buffer $a_1$, sends out packets in the buffer $a_1$ from the first egress port, and sends out all the packets in the buffer $a_1$ (that is, empties a packet queue in the buffer $a_1$) before $T_4=4$. A time length of $T_4=3$ to $T_4=4$ is $T_c$. By analogy, the buffer $a_1$, the buffer $b_1$, and a buffer $c_1$ can be cyclically scheduled. In this implementation of this application, the unit of $T_4$ may include millisecond, microsecond, or nanosecond, which is not limited in this application. Moreover, the specific values of $T_4$ in the above description are example values. According to the above description, whenever a specific moment of $T_4$ is reached, a buffer scheduled by the first network device is switched. Therefore, $T_4$ may be understood as a switching time of the buffer $a_1$, the buffer $b_1$, and the buffer $c_1$. In other words, as the switching time, $T_4$ may be considered as a start moment of scheduling of the buffer ($a_2$, $b_2$, or $c_2$), or may be considered as an end moment of scheduling of the buffer ($a_2$, $b_2$, or $c_2$). With reference to the foregoing description of L1 in FIG. 2, the switching cycle for the plurality of buffers of the second egress port of the second network device and the switching cycle for the plurality of buffers of the first egress port of the first network device are the same and are both $T_c$. In addition, the switching time of the plurality of buffers for the second egress port of the second network device and the switching time of the plurality of buffers for the first egress port of the first network device are synchronized, that is, $T_1$ and $T_4$ are synchronized.

With reference to the foregoing description, after the first network device completes processing of the first data packet and obtains the second data packet, the first network device stores the second data packet in the buffer of the first network device. For example, referring to FIG. 2, in the cycle of $T_4=0$ to $T_4=1$, the first network device schedules the buffer $a_1$. As such, at $T_4=1$, all the packets stored in the buffer $a_1$ have been sent out via the first egress port, that is, the packet queue in the buffer $a_1$ is emptied. The buffer $b_1$ and the buffer $c_1$ are scheduled by the first network device in the two cycles of $T_4=1$ to $T_4=2$ and $T_4=2$ to $T_4=3$, respectively, and the buffer $a_1$ is not scheduled by the first network device. Therefore, from $T_4=1$ to $T_4=3$, the buffer $a_1$ can be used to store a packet processed by the first network device, so that the first network device sends the packet in the buffer $a_1$ when rescheduling the buffer $a_1$. In an actual application scenario, although $T_1$ and $T_4$ are synchronized, and the first network device and the second network device have the same $T_c$, there is a phase difference between the first network device and the second network device, as shown by $T_{AB}$ in L4 in FIG. 2. Therefore, in the cycle of $T_{AB}$, the buffer $a_1$ does not buffer a packet, and a storage space of the buffer $a_1$ remains empty. After the end of the cycle of $T_{AB}$ (an end moment of $T_{AB}$ is the right long dashed line of the $T_{AB}$ interval), the buffer $a_1$ may start to buffer a packet. Further referring to FIG. 2, according to L3, the first data packet is necessarily processed by the first network device in $T_3=1.5$ to $T_3=2.5$, and the second data packet is generated. Obviously, the cycle of $T_3=1.5$ to $T_3=2.5$ falls into a cycle of $T_4=1$ to $T_4=3$, and therefore the second data packet is received and stored by the buffer $a_1$. Moreover, the latest moment at which the second data packet is stored by the buffer $a_1$ is $T_3=2.5$. With reference to the foregoing description, a data packet sent by the second network device in the cycle of $T_1=0$ to $T_1=1$ may enter the buffer $a_1$ in the cycle of $T_3=1.5$ to $T_3=2.5$ (or before $T_3=2.5$). In the cycle of $T_4=2$ to $T_4=3$, the buffer $c_1$ is being scheduled by the first network device. Therefore, before $T_4=3$, even if the buffer $a_1$ has buffered all the data packets sent by the second network device in the cycle of $T_1=0$ to $T_1=1$, these data packets do not be sent via the first egress port. Therefore, in the cycle of $T_4=2$ to $T_4=3$, all the data packets (second data packets) in the buffer $a_1$ reaches an egress queue of the first egress port, waiting to be sent. Then, at the moment $T_4=3$, the buffer of the first network device is switched. In the cycle of $T_4=3$ to $T_4=4$, the buffer $a_1$ is rescheduled by the first network device, and the data packets (second data packets) in the buffer $a_1$ are sent out via the first egress port.

With reference to the implementation shown in FIG. 2, the first network device and the second network device need to perform precise time synchronization. For example, the corresponding cycle in which the buffer $a_2$ of the second network device is scheduled is $T_1=0$ to $T_1=1$, the corresponding cycle in which the buffer $b_2$ is scheduled is $T_1=1$ to $T_1=2$, the corresponding cycle in which the buffer $c_2$ is scheduled is $T_1=2$ to $T_1=3$. Correspondingly, the corresponding cycle in which the buffer $a_1$ of the first network device is scheduled is $T_4=0$ to $T_4=1$, the corresponding cycle in which the buffer $b_1$ is scheduled is $T_4=1$ to $T_4=2$, the corresponding cycle in which the buffer $c_1$ is scheduled is $T_4=2$ to $T_4=3$. Therefore, precise time synchronization increases the difficulty and cost of network deployment. In addition, there is clock jitter on a transmission path of the communications network. There may be a plurality of network devices on the transmission path. For example, there are a network device 1, a network device 2, a network device 3, a network device 4, and a network device 5 on the transmission path. According to the method described in FIG. 2, the network device 1, the network device 2, the network device 3, the network device 4, and the network device 5 need to perform precise time synchronization. Clock jitter occurs on every network device on the transmission path, and accumulates as data packets are transmitted on the transmission path. For example, when a data packet reaches the network device 5, clock jitter from the network device 1 to the network device 4 has been accumulated. Therefore, during the precise time synchronization in the communications network, the accumulation of clock jitter also needs to be considered, which inevitably increases the difficulty of implementing the precise time synchronization.

Figure 3:
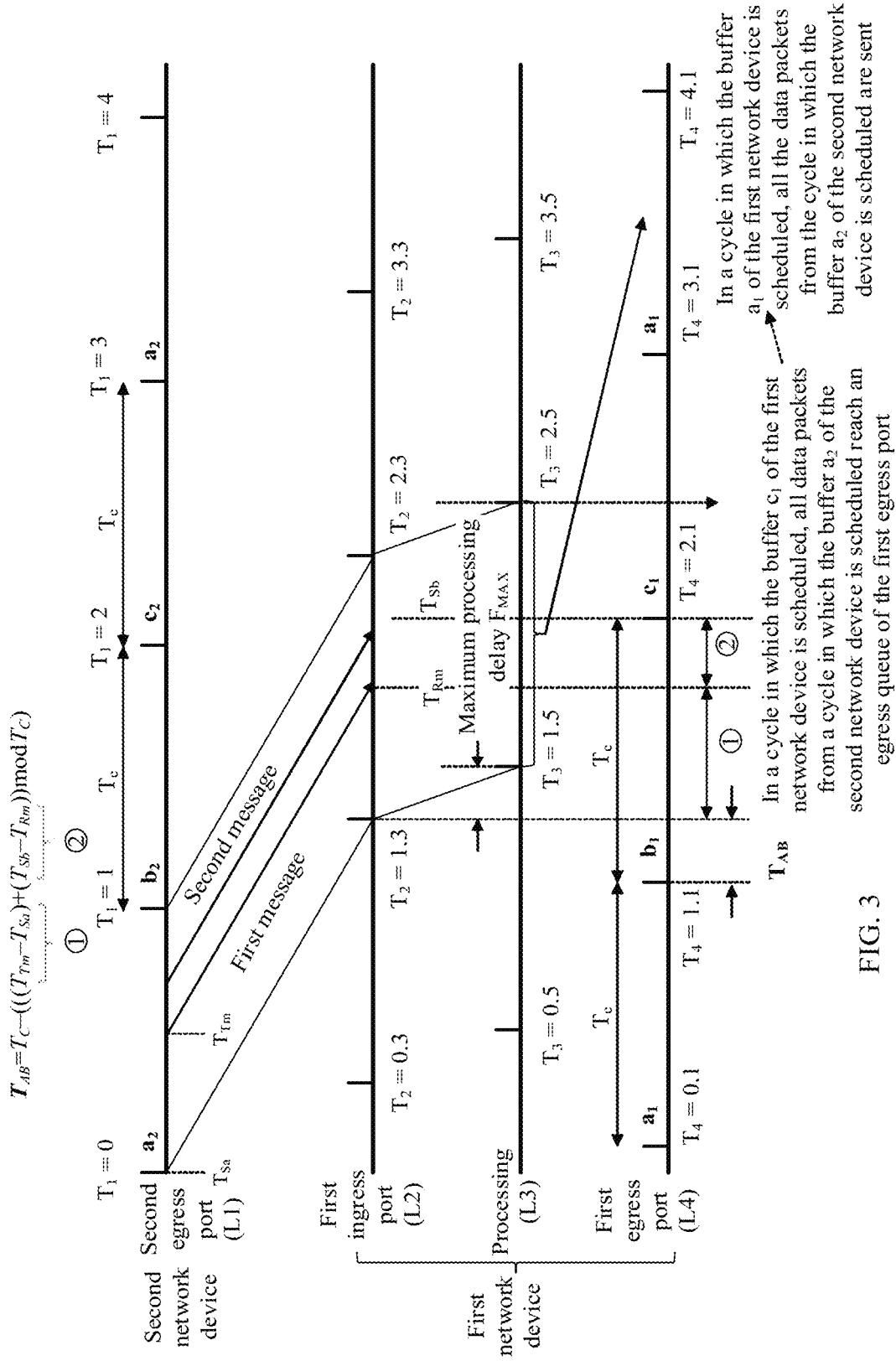
FIG. 3 is a schematic diagram of another packet forwarding process according to an embodiment of this application.

FIG. 3 shows, based on the network structure shown in FIG. 1, a process of transmitting a packet from the second network device to the first network device. It can be seen from the implementation process shown in FIG. 3 that a switching time of each buffer in $L_1$ is different from a switching time of each corresponding buffer in $L_4$. Therefore, the first network device and the second network device are not synchronized in terms of time, that is, the first network device and the second network device can implement queuing and forwarding of data packets without time synchronization. Similar to FIG. 2, in FIG. 3, from top to bottom, a total of four horizontal long solid lines are shown, namely L1, L2, L3, and L4. L1 shows a packet dequeuing process at the second egress port of the second network device, L2 shows a packet queuing process at the first ingress port of the first network device, L3 shows a packet processing process inside the first network device, and L4 shows a packet dequeuing process at the first egress port of the first network device.

As shown in FIG. 3, the second network device sets three buffers, namely a buffer $a_2$, a buffer $b_2$, and a buffer $c_2$, for the second egress port. A cycle for which each buffer is scheduled by the second network device is the same and is $T_c$. Correspondingly, the first network device sets three buffers, namely a buffer $a_1$, a buffer $b_1$, and a buffer $c_1$, for the first egress port. A cycle for which each buffer is scheduled by the first network device is the same and is $T_c$. In FIG. 3, for an implementation of scheduling the buffer $a_2$, the buffer $b_2$, the buffer $c_2$, the buffer $a_1$, the buffer $b_1$, and the buffer $c_1$, refer to the foregoing description with respect to FIG. 2, and details are not described herein again. A difference between FIG. 2 and FIG. 3 lies in that the first network device and the second network device are not synchronized in terms of time. Further, referring to L4 in FIG. 3, in a cycle of $T_4=0.1$ to $T_4=1.1$, the first network device schedules the buffer $a_1$, in a cycle of $T_4=1.1$ to $T_4=2.1$, the first network device schedules the buffer $b_1$, in a cycle of $T_4=2.1$ to $T_4=3.1$, the first network device schedules the buffer $c_1$, and in a cycle of $T_4=3.1$ to $T_4=4.1$, the first network device reschedules the buffer $a_1$. The following further describes, with reference to FIG. 3 and FIG. 4, a specific implementation in which the first network device and the second network device can implement queuing and forwarding of data packets without time synchronization.

Figure 4:
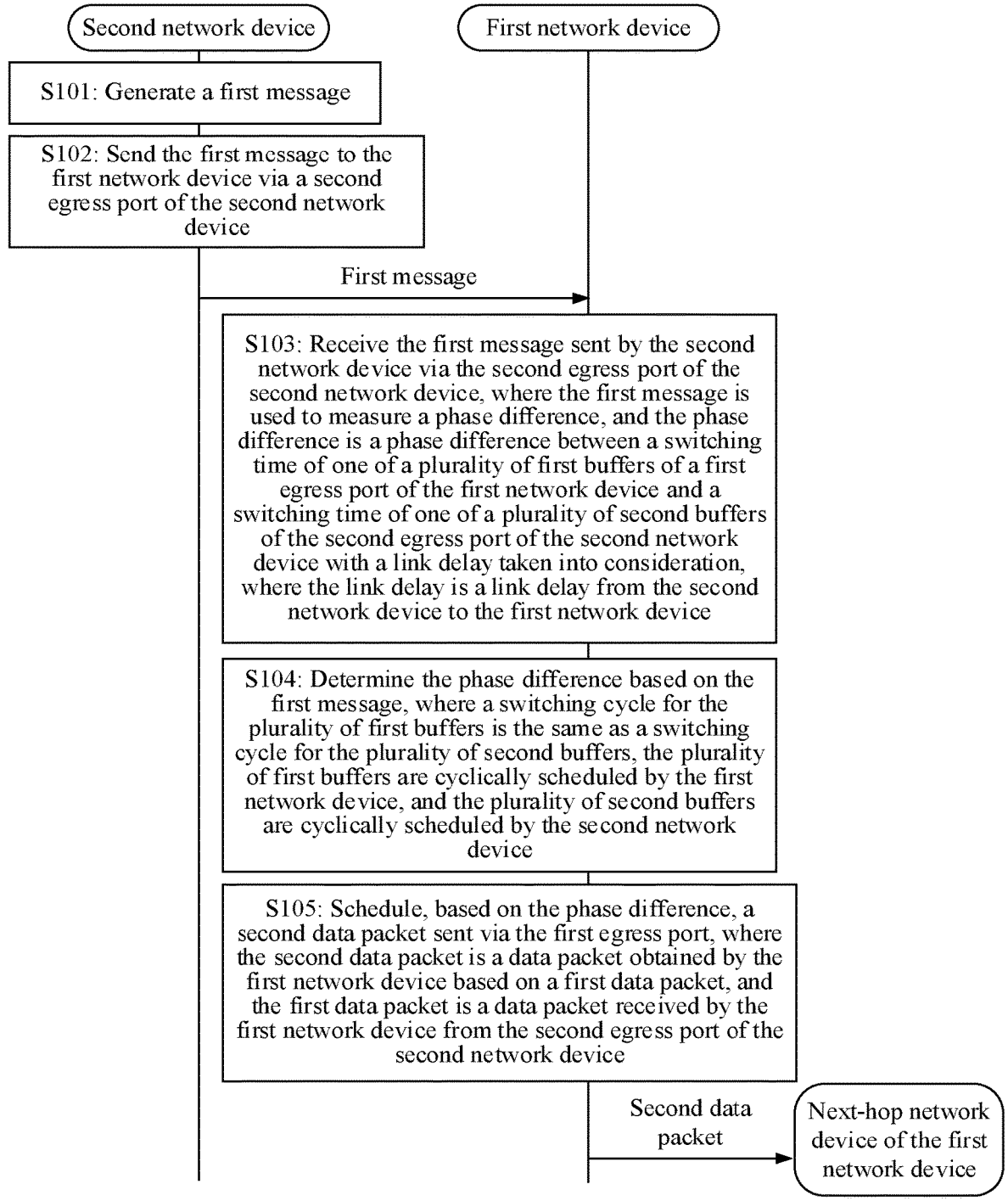
FIG. 4 is a flowchart of a packet forwarding method according to an embodiment of this application.

FIG. 4 is a flowchart of a packet forwarding method according to an embodiment of this application. The method shown in FIG. 4 can be applied to the network structure shown in FIG. 1 to implement the packet forwarding process shown in FIG. 3. The method includes the following steps.

S101: A second network device generates a first message.

S102: The second network device sends the first message to a first network device via a second egress port of the second network device.

S103: The first network device receives the first message sent by the second network device via the second egress port of the second network device, where the first message is used to measure a phase difference, and the phase difference is a phase difference between a switching time of one of a plurality of first buffers of a first egress port of the first network device and a switching time of one of a plurality of second buffers of the second egress port of the second network device with a link delay taken into consideration, where the link delay is a link delay from the second network device to the first network device.

In the implementation shown in FIG. 3, to ensure that the use of resources by each buffer does not exceed the limit, a communications network needs to plan data traffic flowing through a communications link in the communications network. For example, in a cycle of scheduling the buffer $a_2$, the second network device sends out a first data packet via the second egress port. The first network device obtains a corresponding second data packet based on the first data packet. Then, the first network device needs to determine which buffer (the buffer $a_1$, $b_1$, or $c_1$) is scheduled in a cycle during which the second data packet is sent. When there is a plurality of first data packets, there are also a plurality of corresponding second data packets. When a buffer (for example, the buffer $a_1$) of the first network device is used to buffer the second data packet, and after the buffer $a_1$ buffers all the second data packets, the buffered second data packets start to be sent when a cycle of scheduling the buffer $a_1$ arrives. For example, in the cycle of scheduling the buffer $a_2$, the second network device sends out 10 first data packets via the second egress port (the 10 first data packets are all the data packets sent in the cycle of scheduling the buffer $a_2$). The first network device obtains corresponding 10 second data packets based on the 10 first data packets. Then, the first network device buffers the 10 second data packets in a buffer (for example, the buffer $a_1$). When the first network device determines that all the 10 second data packets are buffered in the buffer $a_1$, the buffered 10 second data packets start to be sent when the cycle of scheduling the buffer $a_1$ arrives. To implement the foregoing method, the first network device needs to determine, based on a phase difference $T_{AB}$, to receive the first data packet sent from the buffer $a_2$ scheduled by the second network device, and the first network device needs to determine, based on the phase difference $T_{AB}$, a corresponding buffer for buffering and sending the second data packet. According to the implementation of FIG. 3, this implementation of this application proposes an implementation for determining the phase difference $T_{AB}$, thereby ensuring that the first network device and the second network device implement queuing and forwarding of data packets without time synchronization. In other words, regardless of whether the first network device and the second network device are configured for time synchronization, the queuing and forwarding of the data packets are not affected.

In the implementation shown in FIG. 3, two types of messages may be defined: the first message and a second message. Both the first message and the second message are used to determine the phase difference $T_{AB}$. The phase difference $T_{AB}$ is a phase difference between a switching time of one of the plurality of first buffers of the first egress port of the first network device and a switching time of one of the plurality of second buffers of the second egress port of the second network device with a link delay taken into consideration, where the link delay is a delay of the link from the second network device to the first network device. The plurality of first buffers may be the buffer $a_1$, the buffer $b_1$, and the buffer $c_1$ in FIG. 3, and the plurality of second buffers may be the buffer $a_2$, the buffer $b_2$, and the buffer $c_2$ in FIG. 3. The switching time of the plurality of first buffers of the first egress port of the first network device may be $T_4$ in FIG. 3, and the switching time of the plurality of second buffers of the second egress port of the second network device may be $T_1$ in FIG. 3. Correspondingly, the phase difference $T_{AB}$ may be considered as a phase difference between $T_4$ and $T_1$ with the link delay taken into consideration. According to FIG. 3, the switching time $T_4$ includes $T_4=0.1$, $T_4=1.1$, $T_4=2.1$, $T_4=3.1$, and $T_4=4.1$, and the switching time $T_1$ includes $T_1=0$, $T_1=1$, $T_1=2$, $T_1=3$, and $T_1=4$. According to the foregoing description, because both a switching cycle of $T_4$ and a switching cycle of $T_1$ are $T_c$, regardless of which of the above five values a value of $T_4$ is specified as, and which of the above five values a value of $T_1$ is specified as, a finally calculated phase difference $T_{AB}$ is the same. For example, a phase difference between $T_4=1.1$ and $T_1=1$ is the same as a phase difference between $T_4=3.1$ and $T_1=1$. The phase difference $T_{AB}$ determined in this implementation of this application is a phase difference with the link delay taken into consideration. Further, the link delay is considered in the process of calculating the phase difference $T_{AB}$. The link delay is a delay of the link from the second network device to the first network device, that is, a delay that occurs as a packet passes through the link between the second network device and the first network device when the second network device sends the packet to the first network device.

Further, the first message is, for example, a COMM, and the second message is, for example, a COFM. In a possible implementation, the second network device sends the first message and the second message to the first network device. In another possible implementation, the second network device sends the first message to the first network device, but does not send the second message to the first network device. The following separately describes the two implementations, and in the subsequent description, a COMM and a COFM are used as examples for description.

In a possible implementation, the second network device sends a COMM and a COFM to the first network device. Further, the second network device generates the COMM, and the COMM is used to measure the phase difference TAB. Optionally, the COMM includes a first identifier, and the first identifier is used to identify the COMM, so as to distinguish it from another COMM. After generating the COMM, the second network device sends the COMM to the first network device via the second egress port of the second network device. Referring to the "first message" shown in FIG. 3, the second network device schedules the buffer $a_2$ in the cycle of $T_1=0$ to $T_1=1$. Correspondingly, the second network device sends the COMM in the cycle of $T_1=0$ to $T_1=1$. The COMM may be sent to the first network device along with the first data packet while the second network device schedules the buffer $a_2$ to send the first data packet. Certainly, the COMM may not be sent along with the first data packet, but may be sent separately. For example, the COMM is sent before the second network device transmits a data packet to the first network device. After sending the COMM, the second network device records a first time and a second time. The first time is a time at which the second network device sends the COMM, as shown by $T_{Tm}$ in FIG. 3. The second time is a first switching time of a second buffer in the plurality of second buffers that is scheduled when the COMM is sent, and the first switching time is earlier than the first time. As shown in FIG. 3, the second network device sends the COMM during the scheduling of the buffer $a_2$, and therefore, the second time is $T_{Sa}$ in FIG. 3, that is, $T_1=0$.

After sending the COMM, the second network device generates the COFM. Optionally, the COFM includes a second identifier, the second identifier is used to identify the COFM, and the second identifier corresponds to the first identifier. That the second identifier corresponds to the first identifier means that the second identifier is the same as the first identifier, or that there is a correspondence between the second identifier and the first identifier. Based on the second identifier and the first identifier, the first network device may determine that the COMM and the COFM are a pair of associated messages. Certainly, the COMM and the COFM may not include the first identifier and the second identifier, respectively. As such, after the first network device receives the COFM, the COFM and the latest COMM received before the COFM is received form a pair of associated messages by default. Further, the COFM includes the first time $T_{Tm}$ and the second time $T_{Sa}$, or the COFM includes a difference between the first time $T_{Tm}$ and the second time $T_{Sa}$, that is, a value corresponding to $T_{Tm}-T_{Sa}$.

Correspondingly, the first network device receives the COMM and COFM sent by the second network device via the second egress port of the second network device. Further, after receiving the COMM, the first network device determines a third time based on the COMM, and the third time is a time at which the first network device receives the COMM, as shown by $T_{Rm}$ in FIG. 3. $T_{Rm}$ may be a time at which the first network device receives the first bit of data of the COMM, or $T_{Rm}$ may be a time at which the first network device receives all content of the COMM. After determining the third time, the first network device determines a fourth time based on the third time. The fourth time is a second switching time of a corresponding first buffer in the plurality of first buffers that is scheduled when the COMM is received, and the second switching time is later than the third time. As shown in FIG. 3, the first network device knows each switching time of its own $T_4$, and the first network device can determine the buffer $b_1$ of the first network device that is scheduled when the COMM is received. Therefore, the first network device determines, based on the third time, $T_4=2.1$ as the fourth time, that is, $T_{Sb}$ in FIG. 3. Therefore, the first network device obtains the third time $T_{Rm}$ and the fourth time $T_{Sb}$. In addition, after receiving the COFM, the first network device can obtain $T_{Tm}$ and $T_{Sa}$ in the COFM, or obtain the value corresponding to $T_{Tm}-T_{Sa}$ in the COFM.

In another possible implementation, the second network device sends a COMM to the first network device, but does not send a COFM to the first network device. To distinguish from the foregoing implementation, the COMM in this implementation is represented by a COMM_1. For a mechanism used by the second network device to generate and send the COMM_1, refer to the foregoing implementation, and details are not described herein again. Content carried by the COMM_1 in this implementation is different from the content carried by the COMM in the foregoing implementation. Because the COFM is not sent in this implementation, the information in the COFM may be carried in the COMM_1. In other words, the COMM_1 includes the first time $T_{Tm}$ and the second time $T_{Sa}$, or the COMM_1 includes the value corresponding to $T_{Tm}-T_{Sa}$. For the explanations of the first time $T_{Tm}$ and the second time $T_{Sa}$, refer to the foregoing implementation. It should be noted that in this implementation, the first time $T_{Tm}$ is not an actual sending time of the COMM_1 that is recorded by the second network device, but is an estimated value calculated by the second network device based on a hardware condition of the second network device for packet processing.

The first network device receives the COMM_1. For an implementation of receiving the COMM_1 by the first network device, refer to the foregoing implementation of receiving the COMM by the first network device, and details are not described herein. After receiving the COMM_1, the first network device may determine a third time $T_{Rm}$ and a fourth time $T_{Sb}$ based on the COMM_1. For an implementation of determining the third time $T_{Rm}$ and the fourth time $T_{Sb}$ by the first network device, refer to the foregoing implementation. In addition, after receiving the COMM_1, the first network device can obtain $T_{Tm}$ and $T_{Sa}$ in the COMM_1, or obtain the value corresponding to $T_{Tm}-T_{Sa}$ in the COMM_1.

In this implementation of this application, a delay that occurs when the first message is transmitted on the link from the second network device to the first network device is the same as the delay that occurs when the first data packet is transmitted on the link.

S104: The first network device determines the phase difference based on the first message, where a switching cycle for the plurality of first buffers is the same as a switching cycle for the plurality of second buffers, the plurality of first buffers are cyclically scheduled by the first network device, and the plurality of second buffers are cyclically scheduled by the second network device.

With reference to the foregoing description, if the first network device receives the COMM_1 of the foregoing implementation, the first network device determines the phase difference $T_{AB}$ based on the COMM_1. If the first network device receives the COMM and the COFM of the foregoing implementation, the first network device determines the phase difference $T_{AB}$ based on the COMM and the COFM. Further, with reference to the foregoing description, the switching cycle for which the second network device schedules the buffers $a_2$, $b_2$, and $c_2$ is $T_c$, and the switching cycle for which the first network device schedules the buffer $a_1$, $b_1$, and $c_1$ is also $T_c$. Therefore, the switching cycle for the buffers of the first network device is the same as the switching cycle for the buffers of the second network device. In other words, a switching frequency of the buffers of the first network device is the same as a switching frequency of the buffers of the second network device. Moreover, the buffers $a_1$, $b_1$, and $c_1$ are cyclically scheduled by the first network device, and the buffers $a_2$, $b_2$, and $c_2$ are cyclically scheduled by the second network device.

For example, the first network device determines the phase difference $T_{AB}$, where a value of the phase difference $T_{AB}$ is equal to a difference between the switching cycle for the plurality of first buffers and a first value, the first value is equal to a value returned by a modulo operation of a second value on the switching cycle for the plurality of first buffers, and the second value is equal to a sum of the difference between the first time and the second time and a difference between the fourth time and the third time. Further, this is shown in Formula 1.

$$T_{AB}=T_c-(((T_{Tm}-T_{Sa})+(T_{Sb}-T_{Rm})) \bmod T_c) \quad \text{Formula 1}$$

where the switching cycle for the plurality of first buffers is $T_c$, the first value is $((T_{Tm}-T_{Sa})+(T_{Sb}-T_{Rm})) \bmod T_c$, the second value is $(T_{Tm}-T_{Sa})+(T_{Sb}-T_{Rm})$, and mod represents a modulo operation.

The first network device can schedule, by using the phase difference $T_{AB}$, data traffic received from the second network device, thereby implementing queuing and forwarding of the data traffic without time synchronization between the first network device and the second network device. It should be noted that there may be a plurality of links between the second network device and the first network device. For example, an egress port 21 of the second network device communicates with an ingress port 11 of the first network device via a link 1, an egress port 22 of the second network device communicates with an ingress port 12 of the first network device via a link 2, and an egress port 23 of the second network device communicates with an ingress port 13 of the first network device via a link 3. The second network device and the first network device may determine phase differences for the link 1, the link 2, and the link 3, respectively, according to the foregoing implementation. To be specific, a phase difference $T_{AB1}$ is determined for the link 1, a phase difference $T_{AB2}$ is determined for the link 2, and the phase difference $T_{AB3}$ is determined for the link 3.

S105: The first network device schedules, based on the phase difference, a second data packet that needs to be sent via the first egress port, where the second data packet is a data packet obtained by the first network device based on a first data packet, and the first data packet is a data packet received by the first network device from the second egress port of the second network device.

With reference to the foregoing description and referring to FIG. 3, the second network device and the first network device are not synchronized in terms of time, that is, $T_4$ and $T_1$ are not synchronized. For example, the second network device sends first data packets in the cycle ($T_1=0$ to $T_1=1$) of scheduling the buffer $a_2$. There is a plurality of first data packets. As shown in FIG. 3, an area formed by the two inclined connecting lines between L1 and L2 (the inclined line from $T_1=0$ to $T_2=1.3$ and the inclined line from $T_1=1$ to $T_2=2.3$) shows an interval in which the first data packets can be sent. To be specific, in this area, the first data packets are sent out by the second network device via the second egress port, and are received by the first network device via the first ingress port. Referring to L2 in FIG. 3, the first network device receives the first data packets via the first ingress port in a cycle of $T_2=1.3$ to $T_2=2.3$. In this way, the first data packets enter a packet queue of the first network device, so that the first network device processes the first data packets.

A value of $T_2$ in L2 in FIG. 3 is determined in a different manner than that in FIG. 2. Further, referring to FIG. 3, the second network device and the first network device are not synchronized in terms of time, that is, $T_1$ and $T_4$ are not synchronized. Therefore, the first network device cannot rely on a value of each moment of $T_4$ to determine a value of each moment of $T_1$. However, with reference to the foregoing description, the first network device can calculate the phase difference $T_{AB}$. Moreover, in FIG. 3, in the calculation of the phase difference $T_{AB}$, the delay of the link from the second network device to the first network device has been considered. Therefore, $T_2$ in L2 may be determined based on $T_4$ and the phase difference $T_{AB}$, that is, $T_2=T_4+T_{AB}$. Equivalently, $T_2$ in L2 may alternatively be determined based on $T_4$, ①, and ②, that is, $T_2=T_4-(T_{Tm}-T_{Sa})+(T_{Sb}-T_{Rm})$. Further, for a way of determining $T_3$ in L3 in FIG. 3, refer to the way of determining $T_3$ in L3 in FIG. 2, and details are not described herein. Similarly, in this implementation of this application, $T_2$ and $T_3$ are introduced for the convenience of describing a forwarding process of a data packet between the second network device and the first network device. In an actual scenario, the first network device does not care about the existence of T2 and $T_3$, that is, the first network device does not need to control or use $T_2$ and $T_3$.

After the first network device receives the first data packet via the first ingress port, the first network device processes the first data packet. L3 of FIG. 3 shows a cycle of processing the first data packet, where for an explanation of a maximum processing delay $F_{MAX}$, refer to the explanation in the embodiment in FIG. 2, and details are not described herein. An area formed by the two inclined connecting lines between L2 and L3 shows a cycle in which the first data packet can be processed. To be specific, data packets are received via the first ingress port within an interval from $T_2=1.3$ to $T_2=2.3$, correspondingly, the first network device completes corresponding processing within an interval from $T_3=1.5$ to $T_3=2.5$ to obtain corresponding second data packets, and stores the second data packets in a buffer of the first network device. There is a plurality of second data packets.

Referring to L4 in FIG. 3, with reference to the foregoing description, the second network device sends, in the cycle of $T_1=0$ to $T_1=1$, the first message and the second message that are related to the calculation of the phase difference $T_{AB}$. According to Formula 1, a position on L4 to which a result of $T_{Tm}-T_{Sa}$ is mapped is shown by ① in the figure, and a position on L4 to which a result of $T_{Sb}-T_{Rm}$ is mapped is shown by ② in the figure. Correspondingly, a position on L4 to which the calculated phase difference $T_{AB}$ is mapped is shown by "$T_{AB}$" in the figure, that is, a corresponding length of time from $T_4=1.1$ to $T_2=1.3$. It should be understood that the position of the $T_{AB}$ shown on L4 is merely for illustration, and when $T_{AB}$ is calculated based on the first message and the second message, the resultant position of $T_{AB}$ does not indicate that $T_{AB}$ necessarily falls into the interval from $T_4=1.1$ to $T_2=1.3$.

According to the foregoing description, the first network device completes the corresponding processing of the first data packets within the interval from $T_3=1.5$ to $T_3=2.5$, and obtains the corresponding second data packets. It should be understood that it is not the case that the first network device buffers all the second data packets into a buffer of the first network device only after obtaining all the second data packets. Each time the first network device obtains a second data packet, the first network device buffers the second data packet into a buffer queue of the first network device, in which the second data packet waits to be sent. Therefore, the processing of the first data packets by the first network device and the buffering of the second data packets by the first network device are performed in parallel. Therefore, a cycle of buffering the second data packets by the first network device also falls into the interval from $T_3=1.5$ to $T_3=2.5$. If duration of the buffering action is considered, an end time of the cycle of buffering the second data packets may be slightly later than $T_3=2.5$. However, such an error does not affect the implementation of the technical solution of this application. Therefore, the description of this implementation of this application ignores a delay caused by the buffering action.

Referring to L4 in FIG. 3, in the cycle of $T_4=0.1$ to $T_4=1.1$, the first network device schedules the buffer $a_1$. If the buffer $a_1$ stores data packets to be sent, the first network device sends these data packets via the first egress port in the cycle of $T_4=0.1$ to $T_4=1.1$. In addition, at $T_4=1.1$, all the data packets stored in the buffer $a_1$ have been sent out via the first egress port, that is, a packet queue in the buffer $a_1$ is emptied. The buffer $b_1$ and the buffer $c_1$ are scheduled by the first network device in the two cycles of $T_4=1.1$ to $T_4=2.1$ and $T_4=2.1$ to $T_4=3.1$, respectively, and the buffer $a_1$ is not scheduled by the first network device in the two cycles. In the implementation shown in FIG. 3, the first network device may determine, based on the phase difference $T_{AB}$ and the internal maximum processing delay $F_{MAX}$ of the first network device, a buffer to which the second data packets should be buffered. Further, the first network device determines a cycle corresponding to $T_{AB}+F_{MAX}$, that is, the cycle corresponding to $T_{AB}+F_{MAX}$ is a cycle of $T_4=1.1$ to $T_3=1.5$. The first network device can know to schedule the buffer $b_1$ in the cycle of $T_4=1.1$ to $T_4=2.1$. Therefore, the first network device determines that the cycle corresponding to $T_{AB}+F_{MAX}$ has exceeded a start time ($T_4=1.1$) at which the buffer $b_1$ is scheduled, and the first network device does not use the buffer $b_1$ to buffer the second data packets. Further, the first data packets are sent by the second network device in the cycle ($T_1=0$ to $T_1=1$) of scheduling the buffer $a_2$, and a length of this cycle is $T_c$. In other words, the earliest limit time and the latest limit time for the second network device to send the first data packets is $T_1=0$ and $T_1=1$, respectively. Correspondingly, a length of the cycle for the first network device to process the first data packet is also $T_c$ (the interval from $T_3=1.5$ to $T_3=2.5$). In other words, the latest limit time for the first network device to process all the first data packets is $T_3=2.5$. The first network device may determine a cycle corresponding to $T_{AB}+F_{MAX}+T_c$ (the cycle of $T_4=1.1$ to $T_3=2.5$). The first network device can know to schedule the buffer $c_1$ in the cycle of $T_4=2.1$ to $T_4=3.1$. The latest time ($T_3=2.5$) of the cycle corresponding to $T_{AB}+F_{MAX}+T_c$ has been exceeded a start time ($T_4=2.1$) at which the buffer $c_1$ is scheduled. If the first network device uses the buffer $c_1$ to buffer the second data packets, it is possible that the buffer $c_1$ has been scheduled by the first network device to send data packets before all the second data packets have been buffered. Therefore, the first network device does not use the buffer $c_1$ to buffer the second data packets. Accordingly, the first network device may determine to use the buffer $a_1$ to buffer the second data packets. Therefore, it can be seen from FIG. 3 that the cycle of $T_3=1.5$ to $T_3=2.5$ is mapped to a cycle in L4 in which the first network device schedules the buffer $c_1$, so as to ensure that the buffer $a_1$ is used to buffer all the second data packets into the queue. In other words, in the cycle of $T_4=2.1$ to $T_4=3.1$, all the data packets (second data packets) in the buffer $a_1$ reaches an egress queue of the first egress port, waiting to be sent. Then, at the moment $T_4=3.1$, the buffer of the first network device is switched. In the cycle of $T_4=3.1$ to $T_4=4.1$, the buffer $a_1$ is rescheduled by the first network device, and the data packets (second data packets) in the buffer $a_1$ are sent out via the first egress port. In the foregoing implementation, the maximum processing delay $F_{MAX}$ is used. In an actual application, it is not limited to the use of $F_{MAX}$, and another form of processing delay may be used, such as an average processing delay.

Optionally, in the first network device, there are four buffers that can be scheduled, namely buffers $a_1$, $b_1$, $c_1$, and $d_1$. According to the foregoing implementation, the first network device cyclically schedules the buffers $a_1$, $b_1$, $c_1$, and $d_1$. According to the foregoing method, the first network device determines, based on the phase difference $T_{AB}$, that the buffer $b_1$ or $c_1$ is not used to buffer the second data packets. Accordingly, the first network device may determine to use the buffer $a_1$ or $d_1$ to buffer the second data packets. Then, the first network device may determine that the buffer $d_1$ is scheduled earlier than the buffer $a_1$. Therefore, the first network device preferentially buffers the second data packets into the buffer $d_1$, and sends the second data packets when the buffer $d_1$ is rescheduled.

Optionally, in this implementation of this application, the first message and the second message may be carried in a protocol packet transferred between the first network device and the second network device (for example, when an Internet protocol (IP) packet is transferred between the first network device and the second network device, the first message and the second message may be carried in the IP packet). Alternatively, a new protocol packet may be created in the first network device and the second network device to carry the first message and the second message.

For example, the IEEE 1588 protocol runs in the first network device and the second network device. Then, the first message may be carried in a Sync and Delay_Req message defined by IEEE 1588. For example, a type-length-value (TLV) field is added to the Sync and Delay_Req message to carry the content of the first message. For the definition and explanation of the Sync and Delay_Req message, refer to the corresponding description in IEEE 1588-2008, for example, Table-26 in IEEE 1588-2008. The second message may be carried in a Follow_Up message defined by IEEE 1588. For example, a TLV field is added to the Follow_Up message to carry the content of the second message. For the definition and explanation of the Follow_Up message, refer to the corresponding description in IEEE 1588-2008, for example, Table-27 in IEEE 1588-2008.

According to the foregoing implementation, the first network device determines a phase difference based on a message received from the second network device, where the first network device considers a link delay from the second network device to the first network device when determining the phase difference. Further, the first network device may schedule, based on the phase difference, a data packet sent via the first egress port of the first network device. In this way, the first network device and the second network device implement queuing and forwarding of data packets without time synchronization.

Figure 5:
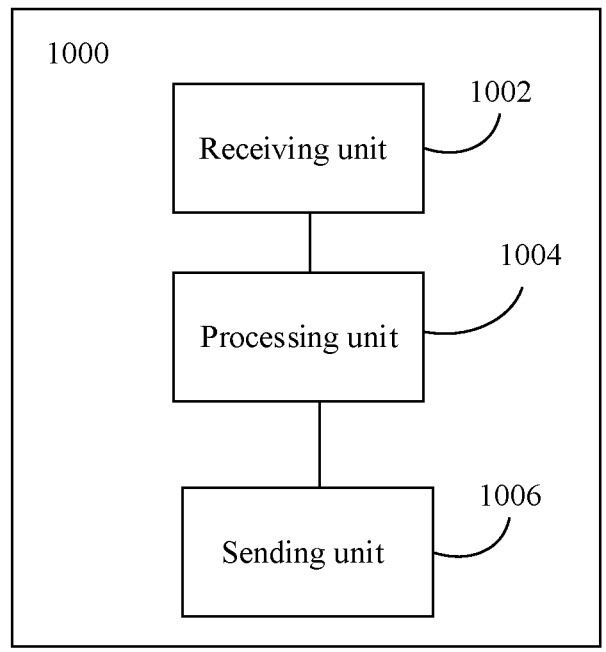
FIG. 5 is a schematic diagram of a structure of a first network device according to an embodiment of this application.

FIG. 5 is a schematic diagram of a structure of a first network device 1000 according to an embodiment of this application. The first network device 1000 shown in FIG. 5 may perform the corresponding steps performed by the first network device in the method of the foregoing embodiment. The first network device is deployed in a communications network, and the communications network further includes a second network device. As shown in FIG. 5, the first network device 1000 includes a receiving unit 1002, a processing unit 1004, and a sending unit 1006.

The receiving unit 1002 is configured to receive a first message sent by a second network device via a second egress port of the second network device, where the first message is used to measure a phase difference, and the phase difference is a phase difference between a switching time of one of a plurality of first buffers of the sending unit 1006 of the first network device and a switching time of one of a plurality of second buffers of the second egress port of the second network device with a link delay taken into consideration, where the link delay is a link delay from the second network device to the first network device.

The processing unit 1004 is configured to determine the phase difference based on the first message, where a switching cycle for the plurality of first buffers is the same as a switching cycle for the plurality of second buffers, the plurality of first buffers are cyclically scheduled by the processing unit 1004, and the plurality of second buffers are cyclically scheduled by the second network device.

The processing unit 1004 is further configured to schedule, based on the phase difference, a second data packet sent via the sending unit 1006, where the second data packet is a data packet obtained by the processing unit 1004 based on a first data packet, and the first data packet is a data packet received by the receiving unit 1002 from the second egress port of the second network device.

Optionally, before the processing unit 1004 determines the phase difference based on the first message, the receiving unit 1002 is further configured to receive a second message sent by the second network device, where the second message includes a first time and a second time, the first time is a time at which the second network device sends the first message, the second time is a first switching time of a second buffer in the plurality of second buffers that is scheduled when the first message is sent, and the first switching time is earlier than the first time, and in terms of determining, by the processing unit 1004, the phase difference based on the first message, the processing unit 1004 is further configured to determine the phase difference based on the first message and the second message.

Optionally, before the processing unit 1004 determines the phase difference based on the first message, the receiving unit 1002 is further configured to receive a second message sent by the second network device, where the second message includes a first time difference, the first time difference is a difference between a first time and a second time, the first time is a time at which the second network device sends the first message, the second time is a first switching time of a second buffer in the plurality of second buffers that is scheduled when the first message is sent, and the first switching time is earlier than the first time, and in terms of determining, by the processing unit 1004, the phase difference based on the first message, the processing unit 1004 is further configured to determine the phase difference based on the first message and the second message.

Optionally, in terms of determining, by the processing unit 1004, the phase difference based on the first message and the second message, the processing unit 1004 is further configured to determine a third time at which the first message is received, determine a fourth time based on the third time, where the fourth time is a second switching time of a corresponding first buffer in the plurality of first buffers that is scheduled when the first message is received, and the second switching time is later than the third time, and determine the phase difference, where a value of the phase difference is equal to a difference between the switching cycle for the plurality of first buffers and a first value, the first value is equal to a value returned by a modulo operation of a second value on the switching cycle for the plurality of first buffers, and the second value is equal to a sum of the difference between the first time and the second time and a difference between the fourth time and the third time.

Optionally, the first message includes a first identifier for identifying the first message, the second message includes a second identifier for identifying the second message, and the first identifier corresponds to the second identifier.

Optionally, the first message includes a first time and a second time, the first time is a time at which the second network device sends the first message, the second time is a first switching time of a second buffer in the plurality of second buffers that is scheduled when the first message is sent, and the first switching time is earlier than the first time.

Optionally, the first message includes a first time difference, the first time difference is a difference between a first time and a second time, the first time is a time at which the second network device sends the first message, the second time is a first switching time of a second buffer in the plurality of second buffers that is scheduled when the first message is sent, and the first switching time is earlier than the first time.

Optionally, in terms of determining, by the processing unit 1004, the phase difference based on the first message, the processing unit 1004 is further configured to determine a third time at which the first message is received, and determine a fourth time based on the third time, where the fourth time is a second switching time of a corresponding first buffer in the plurality of first buffers that is scheduled when the first message is received, and the second switching time is later than the third time, and determine the phase difference, where a value of the phase difference is equal to a difference between the switching cycle for the plurality of first buffers and a first value, the first value is equal to a value returned by a modulo operation of a second value on the switching cycle for the plurality of first buffers, and the second value is equal to a sum of the difference between the first time and the second time and a difference between the fourth time and the third time.

Optionally, in terms of scheduling, by the processing unit 1004 based on the phase difference, the second data packet sent via the sending unit 1006, the processing unit 1004 is further configured to determine a corresponding first buffer for the second data packet based on the phase difference and a processing delay, where the plurality of first buffers include the corresponding first buffer, and the processing delay is a delay that occurs in the process of determining, by the processing unit 1004, the second data packet based on the first data packet, and store the second data packet in the corresponding first buffer.

In the first cycle that is after the second data packet is stored and in which the corresponding first buffer is scheduled by the processing unit 1004, the sending unit 1006 sends the second data packet.

The first network device shown in FIG. 5 may perform the corresponding steps performed by the first network device in the method in the foregoing embodiment. The first network device determines a phase difference based on a message received from the second network device, where the first network device considers a link delay from the second network device to the first network device when determining the phase difference. Further, the first network device may schedule, based on the phase difference, a data packet sent via the first egress port of the first network device. In this way, the first network device and the second network device implement queuing and forwarding of data packets without time synchronization.

Figure 6:
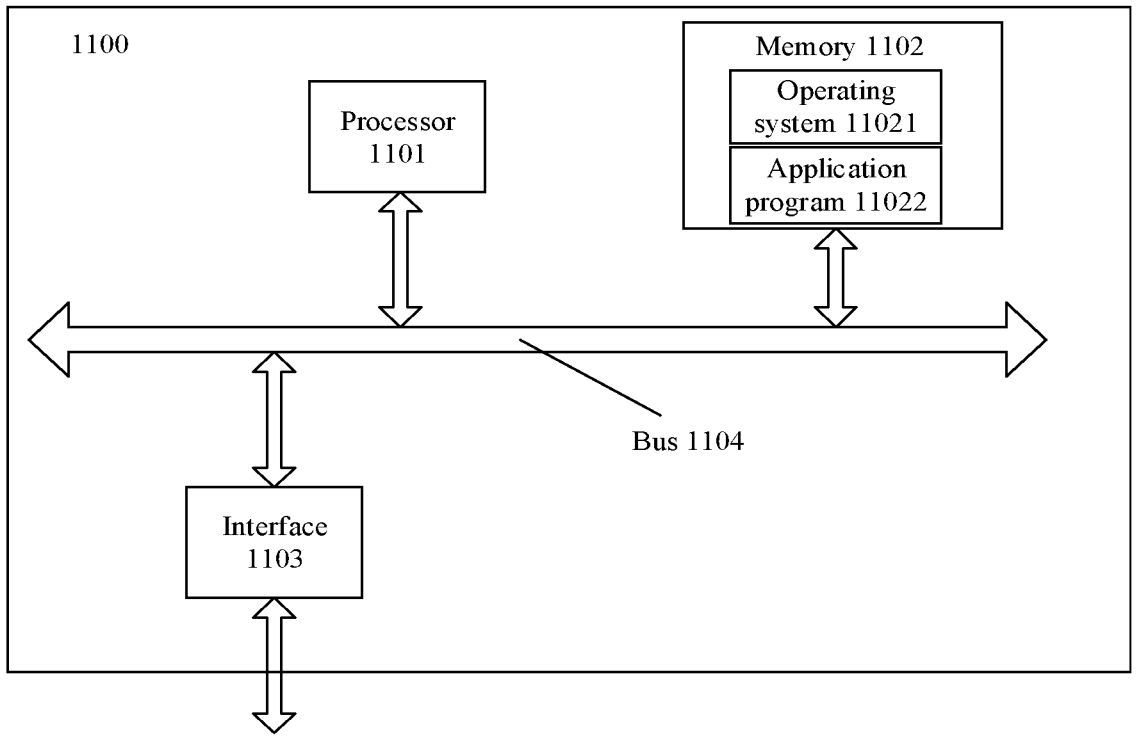
FIG. 6 is a schematic diagram of a hardware structure of a first network device according to an embodiment of this application.

FIG. 6 is a schematic diagram of a hardware structure of a first network device 1100 according to an embodiment of this application. The first network device 1100 shown in FIG. 6 may perform the corresponding steps performed by the first network device in the method in the foregoing embodiment.

As shown in FIG. 6, the first network device 1100 includes a processor 1101, a memory 1102, an interface 1103, and a bus 1104. The interface 1103 may be implemented in a wireless or wired manner, and may be a network adapter. The processor 1101, the memory 1102, and the interface 1103 are connected through the bus 1104.

The interface 1103 may further include a transmitter and a receiver, which are configured to send and receive information between the first network device and the second network device in the foregoing embodiment, and between the first network device and a next-hop device of the first network device. For example, the interface 1103 is configured to support receiving a first message or a first message and a second message sent by the second network device. For another example, the interface 1103 is configured to support receiving a data packet sent by the second network device. For another example, the interface 1103 is configured to support the first network device in sending a data packet. As an example, the interface 1103 is configured to support the processes S103 and S105 in FIG. 4. The processor 1101 is configured to perform the processing performed by the first network device in the foregoing embodiment. For example, the processor 1101 is configured to determine a phase difference, and/or used in other processes of the technology described herein. As an example, the processor 1101 is configured to support the process S104 in FIG. 4. The memory 1102 includes an operating system 11021 and an application program 11022, and is configured to store a program, code, or instructions. When executing the program, the code, or the instructions, the processor or a hardware device may complete the processing processes of the first network device in the method embodiment. Optionally, the memory 1102 may include a ROM and a RAM. The ROM includes a basic input/output system (BIOS) or an embedded system. The RAM includes an application program and an operating system. When the first network device 1100 needs to run, a bootloader in the BIOS or the embedded system that is firmed in the ROM is used to boot a system to start, and boot the first network device 1100 to enter a normal running state. After entering the normal running state, the first network device 1100 runs the application program and the operating system in the RAM, to complete the processing processes of the first network device in the method embodiment.

It may be understood that FIG. 6 shows merely a simplified design of the first network device 1100. In an actual application, the first network device may include any quantity of interfaces, processors, or memories.

Figure 7:
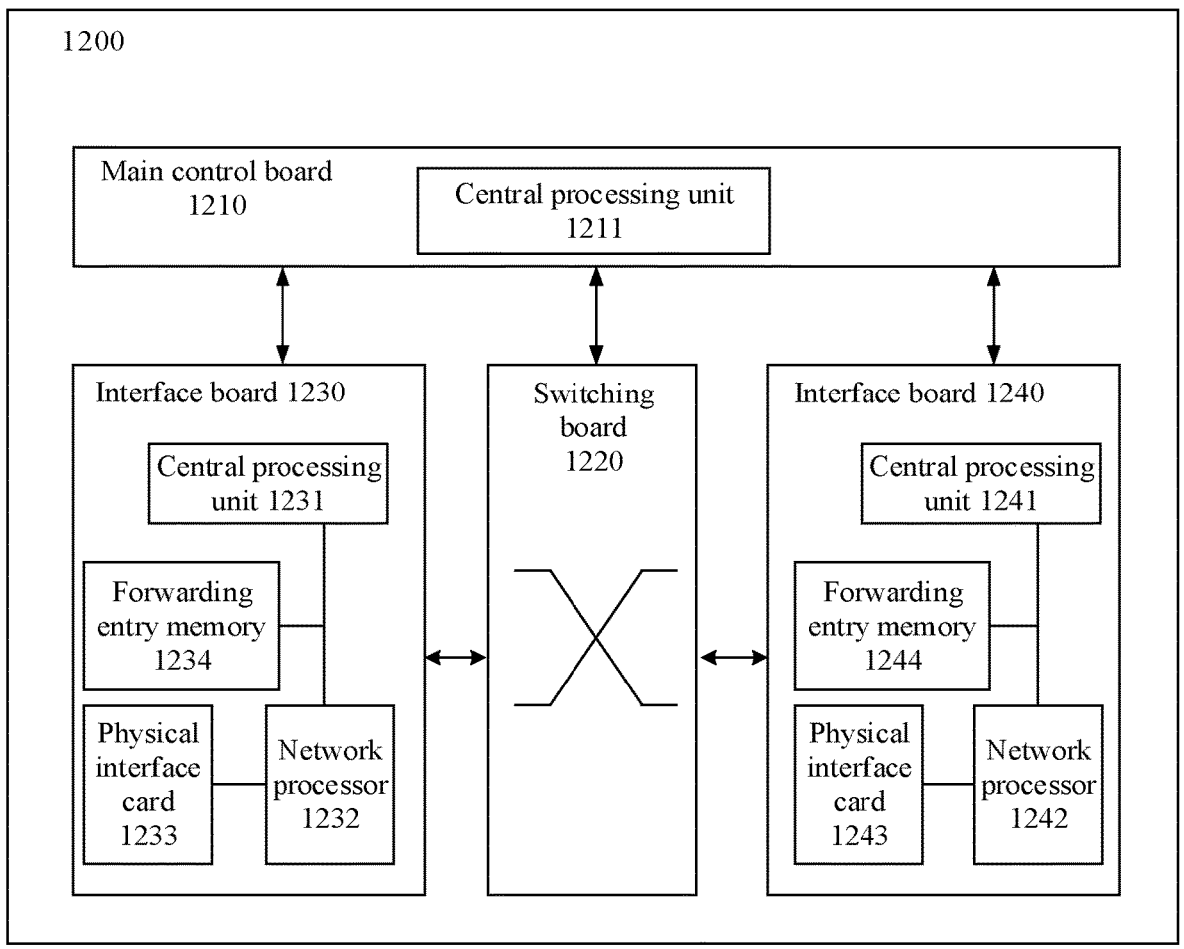
FIG. 7 is a schematic diagram of a hardware structure of another first network device according to an embodiment of this application.

FIG. 7 is a schematic diagram of a hardware structure of another first network device 1200 according to an embodiment of this application. The first network device 1200 shown in FIG. 7 may perform the corresponding steps performed by the first network device in the method of the foregoing embodiment.

As shown in FIG. 7, the first network device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to exchange data between interface boards (the interface board is also referred to as a line card or a service board). The interface boards 1230 and 1240 are configured to provide various service interfaces (for example, a point of sale (POS) interface, a Gigabit Ethernet (GE) interface, and an Asynchronous Transfer Mode (ATM) interface), and forward a data packet.

The interface board 1230 may include a central processing unit (CPU) 1231, a forwarding entry memory 1234, a physical interface card 1233, and a network processor 1232. The CPU 1231 is configured to control and manage the interface board, and communicate with a CPU on the main control board. The forwarding entry memory 1234 is configured to store a forwarding entry. The physical interface card 1233 is configured to receive and send traffic. The network memory 1232 is configured to control, based on the forwarding entry, the physical interface card 1233 to receive and send the traffic.

Further, the physical interface card 1233 is configured to receive a first message (or a first message and a second message) sent by the second network device and receive a data packet sent by the second network device. The physical interface card 1233 is further configured to forward a data packet to a next-hop network device of the first network device.

After receiving the first message (or the first message and the second message) and the data packet, the physical interface card 1233 sends the first message (or the first message and the second message) and the data packet to a CPU 1211 via the CPU 1231. The CPU 1211 processes the first message (or the first message and the second message) and the data packet.

The CPU 1211 is further configured to determine a phase difference.

The CPU 1231 is further configured to control the network memory 1232 to obtain the forwarding entry in the forwarding entry memory 1234, and the CPU 1231 is further configured to control the network memory 1232 to forward a data packet to the next-hop network device on the transmission path via the physical interface card 1233.

It should be understood that operations on the interface board 1240 are the same as the operations on the interface board 1230 in this embodiment of the present application. For brevity, details are not described. It should be understood that the first network device 1200 in this embodiment may correspond to the functions and/or the various implemented steps in the foregoing method embodiment. Details are not described herein.

In addition, it should be noted that there may be one or more main control boards. When there is a plurality of main control boards, the main control boards may include an active main control board and a backup main control board. There may be one or more interface boards. A first network device having a stronger data processing capability provides more interface boards. There may also be one or more physical interface cards on the interface board. There may be no switching board or one or more switching boards. When there is a plurality of switching boards, load sharing and redundancy backup may be implemented by the switching boards together. In a centralized forwarding architecture, the first network device may not need a switching board, and the interface board undertakes a service data processing function of an entire system. In a distributed forwarding architecture, the first network device may have at least one switching board. Data between a plurality of interface boards is exchanged through the switching board, to provide a large-capacity data exchange and processing capability.

Therefore, a data access and processing capability of the first network device in the distributed architecture is greater than that of the device in the centralized architecture. A specific architecture to be used depends on a specific networking deployment scenario, and is not limited herein.

In addition, an embodiment of this application provides a computer storage medium configured to store computer software instructions used by the foregoing first network device. The computer software instructions include a program designed for performing the foregoing method embodiment.

Figure 8:
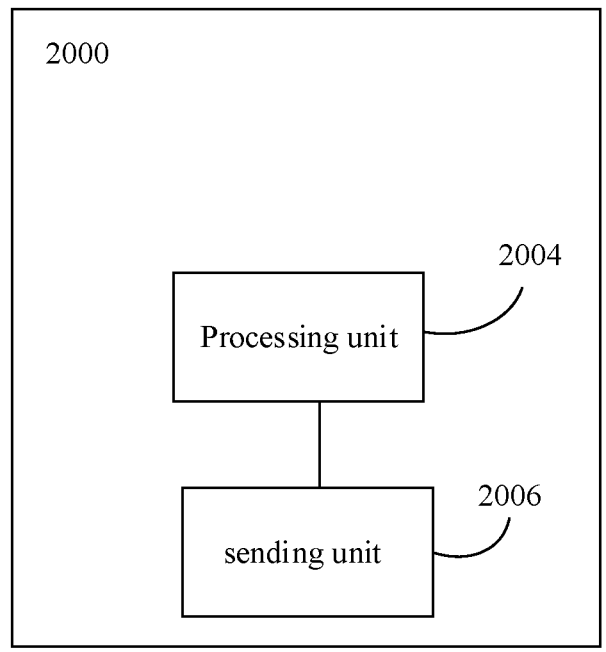
FIG. 8 is a schematic diagram of a structure of a second network device according to an embodiment of this application.

FIG. 8 is a schematic diagram of a structure of a second network device 2000 according to an embodiment of this application. The second network device 2000 shown in FIG. 8 may perform the corresponding steps performed by the second network device in the method in the foregoing embodiment. The second network device is deployed in a communications network, and the communications network further includes a first network device. As shown in FIG. 8, the first network device 2000 includes a processing unit 2004 and a sending unit 2006.

The processing unit 2004 is configured to generate a first message, where the first message is used to trigger a first network device to determine a phase difference, and the phase difference is a phase difference between a switching time of one of a plurality of first buffers of a first egress port of the first network device and a switching time of one of a plurality of second buffers of the sending unit 2006 of the second network device with a link delay taken into consideration, where the link delay is a link delay from the second network device to the first network device.

The sending unit 2006 is configured to send the first message to the first network device, where a switching cycle for the plurality of first buffers is the same as a switching cycle for the plurality of second buffers, the plurality of first buffers are cyclically scheduled by the first network device, and the plurality of second buffers are cyclically scheduled by the processing unit 2004.

Optionally, the processing unit 2004 is further configured to generate a second message, where the second message includes a first time and a second time, the first time is a time at which the sending unit 2006 sends the first message, the second time is a first switching time of a second buffer in the plurality of second buffers that is scheduled when the first message is sent, and the first switching time is earlier than the first time, and the sending unit 2006 is further configured to send the second message to the first network device.

Optionally, the processing unit 2004 is further configured to generate a second message, where the second message includes a first time difference, the first time difference is a difference between a first time and a second time, the first time is a time at which the sending unit 2006 sends the first message, the second time is a first switching time of a second buffer in the plurality of second buffers that is scheduled when the first message is sent, and the first switching time is earlier than the first time, and the sending unit 2006 is further configured to send the second message to the first network device.

Optionally, the first message includes a first identifier for identifying the first message, the second message includes a second identifier for identifying the second message, and the first identifier corresponds to the second identifier.

The second network device shown in FIG. 8 may perform the corresponding steps performed by the second network device in the method of the foregoing embodiment. The first network device determines a phase difference based on a message received from the second network device, where the first network device considers a link delay from the second network device to the first network device when determining the phase difference. Further, the first network device may schedule, based on the phase difference, a data packet sent via the first egress port of the first network device. In this way, the first network device and the second network device implement queuing and forwarding of data packets without time synchronization.

Figure 9:
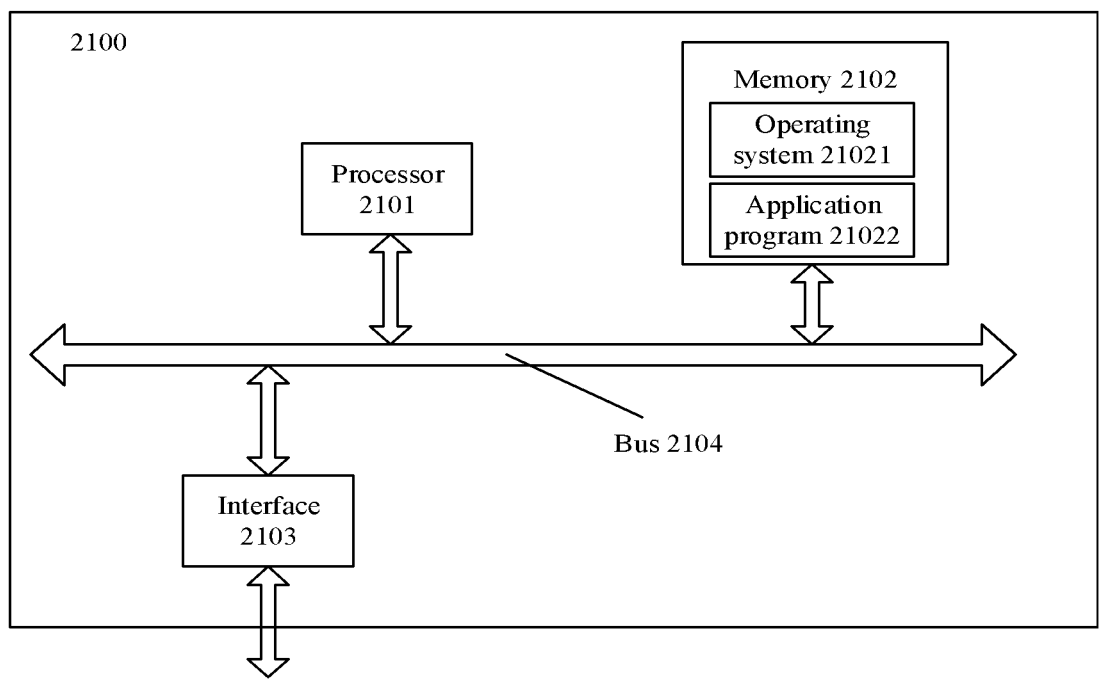
FIG. 9 is a schematic diagram of a hardware structure of a second network device according to an embodiment of this application.

FIG. 9 is a schematic diagram of a hardware structure of a second network device 2100 according to an embodiment of this application. The second network device 2100 shown in FIG. 9 may perform the corresponding steps performed by the second network device in the method in the foregoing embodiment.

As shown in FIG. 9, the second network device 2100 includes a processor 2101, a memory 2102, an interface 2103, and a bus 2104. The interface 2103 may be implemented in a wireless or wired manner, and may be a network adapter. The processor 2101, the memory 2102, and the interface 2103 are connected through the bus 2104.

The interface 2103 may include a transmitter and a receiver, which are configured to send and receive information or data between the second network device and the first network device in the foregoing embodiment. For example, the interface 2103 is configured to support sending a first message (or a first message and a second message) to the first network device. For another example, the interface 2103 is configured to support sending a data packet to the first network device. As an example, the interface 2103 is configured to support the process S102 in FIG. 4. The processor 2101 is configured to perform the processing performed by the second network device in the foregoing embodiment. For example, the processor 2101 is configured to generate the first message (or the first message and the second message), and/or used in other processes of the technology described herein. As an example, the processor 2101 is configured to support the process S101 in FIG. 4. The memory 2102 includes an operating system 21021 and an application program 21022, and is configured to store a program, code, or instructions. When executing the program, the code, or the instructions, the processor or a hardware device may complete the processing processes of the second network device in the method embodiment. Optionally, the memory 2102 may include a ROM and a RAM. The ROM includes a BIOS or an embedded system. The RAM includes an application program and an operating system. When the second network device 2100 needs to run, a bootloader in the BIOS or the embedded system that is firmed in the ROM is used to boot a system to start, and boot the second network device 2100 to enter a normal running state. After entering the normal running state, the second network device 2100 runs the application program and the operating system in the RAM, to complete the processing processes of the second network device in the method embodiment.

It may be understood that FIG. 9 shows only a simplified design of the second network device 2100. In an actual application, the second network device may include any quantity of interfaces, processors, or memories.

Figure 10:
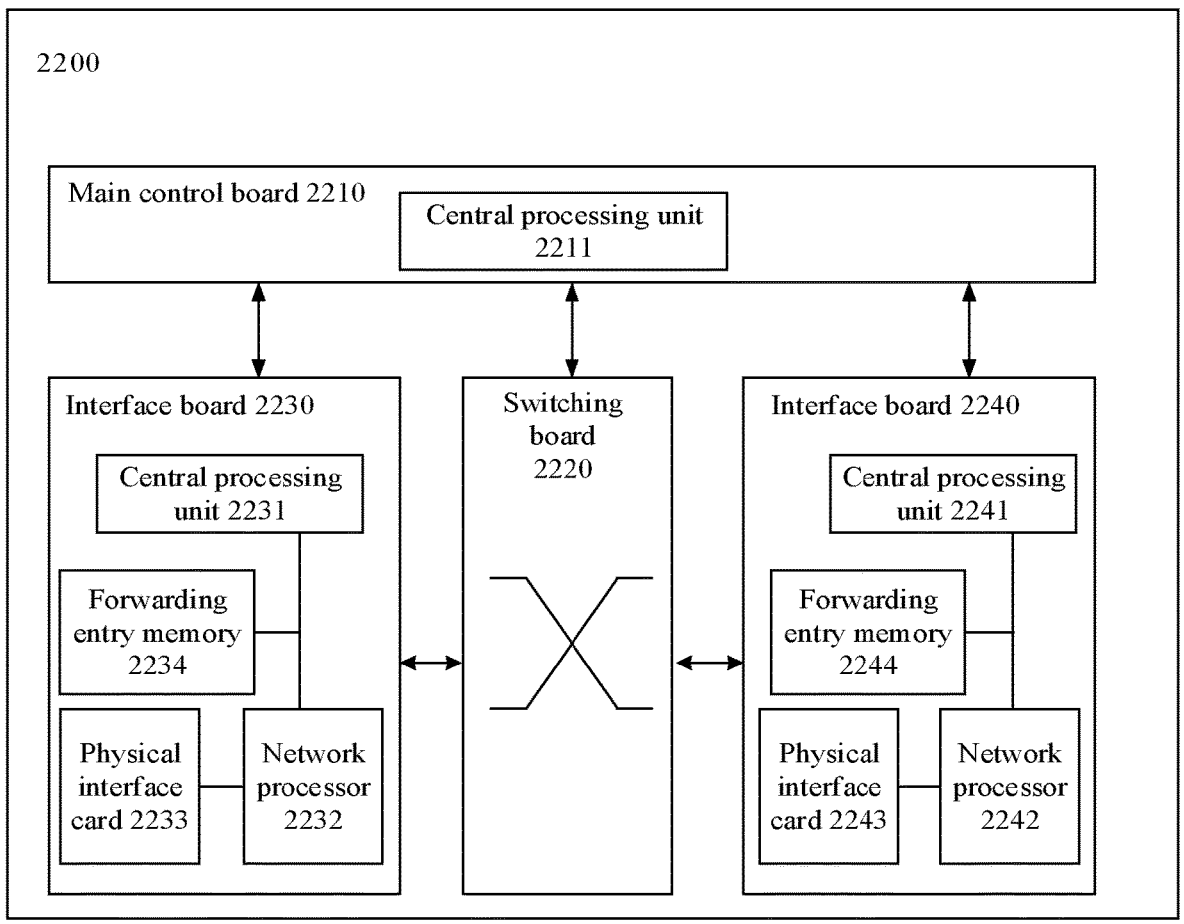
FIG. 10 is a schematic diagram of a hardware structure of another second network device according to an embodiment of this application.

FIG. 10 is a schematic diagram of a hardware structure of another second network device 2200 according to an embodiment of this application. The second network device 2200 shown in FIG. 10 may perform the corresponding steps performed by the second network device in the method in the foregoing embodiment.

As shown in FIG. 10, the second network device 2200 includes a main control board 2210, an interface board 2230, a switching board 2220, and an interface board 2240. The main control board 2210, the interface boards 2230 and 2240, and the switching board 2220 are connected to a system backboard through a system bus for communication. The main control board 2210 is configured to complete functions such as system management, device maintenance, and protocol processing. The switching board 2220 is configured to exchange data between interface boards (the interface board is also referred to as a line card or a service board). The interface boards 2230 and 2240 are configured to provide various service interfaces (for example, a POS interface, a GE interface, and an ATM interface), and forward a data packet.

The interface board 2230 may include a CPU 2231, a forwarding entry memory 2234, a physical interface card 2233, and a network processor 2232. The CPU 2231 is configured to control and manage the interface board, and communicate with a CPU on the main control board. The forwarding entry memory 2234 is configured to store a forwarding entry. The physical interface card 2233 is configured to receive and send traffic. The network memory 2232 is configured to control, based on the forwarding entry, the physical interface card 2233 to receive and send the traffic.

Further, the physical interface card 2233 is configured to send a first message (or a first message and a second message) to the first network device. The physical interface card 2233 is further configured to send a data packet to the first network device. In addition, the physical interface card 2233 is further configured to receive a data packet sent by a previous-hop network device of the second network device.

After receiving the data packet sent by the previous-hop network device of the second network device, the physical interface card 2233 sends the data packet to a CPU 2211 via the CPU 2231. The CPU 2211 processes the data packet.

The CPU 2211 is configured to generate the first message (or the first message and the second message).

The CPU 2231 is further configured to control the network memory 2232 to obtain the forwarding entry in the forwarding entry memory 2234, and the CPU 2231 is further configured to control the network memory 2232 to receive and send the traffic via the physical interface card 2233.

It should be understood that operations on the interface board 2240 are the same as the operations on the interface board 2230 in this embodiment of the present application. For brevity, details are not described. It should be understood that the second network device 2200 in this embodiment may correspond to the functions and/or the various implemented steps in the foregoing method embodiment. Details are not described herein.

In addition, it should be noted that there may be one or more main control boards. When there is a plurality of main control boards, the main control boards may include an active main control board and a backup main control board. There may be one or more interface boards. A second network device having a stronger data processing capability provides more interface boards. There may also be one or more physical interface cards on the interface board. There may be no switching board or one or more switching boards. When there is a plurality of switching boards, load sharing and redundancy backup may be implemented by the switching boards together. In a centralized forwarding architecture, the second network device may not need a switching board, and the interface board undertakes a service data processing function of an entire system. In a distributed forwarding architecture, the second network device may have at least one switching board. Data between a plurality of interface boards is exchanged through the switching board, to provide a large-capacity data exchange and processing capability. Therefore, a data access and processing capability of the second network device in the distributed architecture is better than that of the device in the centralized architecture. A specific architecture to be used depends on a specific networking deployment scenario, and is not limited herein.

In addition, an embodiment of this application provides a computer storage medium configured to store computer software instructions used by the foregoing second network device. The computer software instructions include a program designed for performing the foregoing method embodiment.

An embodiment of this application further includes a network system. The network system includes a first network device and a second network device. The first network device is the first network device in FIG. 5, FIG. 6, or FIG. 7, and the second network device is the second network device in FIG. 8, FIG. 9, or FIG. 10.

Method or algorithm steps described in combination with the content disclosed in this application may be implemented by hardware, or may be implemented by a processor by executing software instructions. The software instructions may be formed by a corresponding software module. The software module may be located in a RAM, a flash memory, a ROM, an erasable programmable ROM (EPROM), an electrically EPROM (EEPROM), a register, a hard disk, a removable magnetic disk, a compact disc (CD) ROM (CD-ROM), or a storage medium of any other form known in the art. For example, a storage medium is coupled to the processor, so that the processor can read information from the storage medium or write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in the foregoing one or more examples, functions described in this application may be implemented by hardware or software. When the present application is implemented by software, the foregoing functions may be stored in a computer-readable medium or transmitted as one or more instructions or code in the computer-readable medium. The computer-readable medium includes a computer storage medium and a communication medium, where the communication medium includes any medium that facilitates transfer of a computer program from one place to another. The storage medium may be any available medium accessible to a general-purpose or special-purpose computer.

The objectives, technical solutions, and beneficial effects of this application are further described in detail in the foregoing specific implementations. It should be understood that the foregoing descriptions are merely specific implementations of this application.

What is claimed is:

1. A packet forwarding method implemented by a first network device, wherein the packet forwarding method comprises:
    receiving a first message from a second network device via a second egress port of the second network device, wherein the first message measures a phase difference, wherein the phase difference is between a first switching time of one of a plurality of first buffers of a first egress port of the first network device and a second switching time of one of a plurality of second buffers of the second egress port with a link delay taken into consideration, and wherein the link delay is from the second network device to the first network device;
    determining, based on the first message, the phase difference, wherein a first switching cycle for the first buffers is the same as a second switching cycle for the second buffers, wherein the first buffers are cyclically scheduled by the first network device, and wherein the second buffers are cyclically scheduled by the second network device;
    receiving, from the second egress port, a first data packet;
    obtaining, based on the first data packet, a second data packet; and
    scheduling, based on the phase difference, the second data packet to send via the first egress port.

2. The packet forwarding method of claim 1, wherein before determining the phase difference, the packet forwarding method further comprises:
    receiving a second message from the second network device, wherein the second message comprises a first time difference between a first time and a second time, wherein the first time is when the second network device sends the first message, wherein the second time is a third switching time of a third buffer in the second buffers that is scheduled when the first message is sent, and wherein the third switching time is earlier than the first time; and
    further determining, based on the second message, the phase difference.

3. The packet forwarding method of claim 1, wherein before determining the phase difference, the packet forwarding method further comprises:
    receiving a second message from the second network device, wherein the second message comprises a first time at which the second network device sends the first message and a second time that is a third switching time of a third buffer in the second buffers that is scheduled when the first message is sent, and wherein the third switching time is earlier than the first time; and
    further determining, based on the second message, the phase difference.

4. The packet forwarding method of claim 3, further comprising:
    determining a third time at which the first message is received;
    determining, based on the third time, a fourth time that is a fourth switching time of a corresponding fourth buffer in the first buffers that is scheduled when the first message is received, and wherein the fourth switching time is later than the third time; and
    further determining, based on the fourth time, the phase difference, wherein a first value of the phase difference is equal to a difference between the first switching cycle and a second value, wherein the second value is equal to a third value returned by a modulo operation of a fourth value on the first switching cycle, and wherein the fourth value is equal to a sum of a first time difference between the first time and the second time and a second time difference between the fourth time and the third time.

5. The packet forwarding method of claim 3, wherein the first message comprises a first identifier for identifying the first message, wherein the second message comprises a second identifier for identifying the second message, and wherein the first identifier corresponds to the second identifier.

6. The packet forwarding method of claim 1, wherein the first message comprises a first time difference between a first time and a second time, wherein the first time is at which the second network device sends the first message, wherein the second time is a third switching time of a third buffer in the second buffers that is scheduled when the first message is sent, and wherein the third switching time is earlier than the first time.

7. The packet forwarding method of claim 1, wherein the first message comprises a first time at which the second network device sends the first message and a second time that is a third switching time of a third buffer in the second buffers that is scheduled when the first message is sent, and wherein the third switching time is earlier than the first time.

8. The packet forwarding method of claim 7, further comprising:
determining a third time at which the first message is received;
determining, based on the third time, a fourth time that is a fourth switching time of a corresponding fourth buffer in the first buffers that is scheduled when the first message is received, and wherein the fourth switching time is later than the third time; and
further determining, based on the fourth time, the phase difference, wherein a first value of the phase difference is equal to a first difference between the first switching cycle and a second value, wherein the second value is equal to a third value returned by a modulo operation of a fourth value on the first switching cycle, and wherein the fourth value is equal to a sum of a first time difference between the first time and the second time and a second time difference between the fourth time and the third time.

9. The packet forwarding method of claim 1, further comprising:
determining, based on the phase difference and a processing delay, a corresponding third buffer for the second data packet, wherein the first buffers comprise the corresponding third buffer, and wherein the processing delay is when determining the second data packet based on the first data packet;
storing, in the corresponding third buffer, the second data packet; and
sending the second data packet via the first egress port during a cycle that is after storing the second data packet and scheduling the corresponding third buffer.

10. A packet forwarding method implemented by a second network device, wherein the packet forwarding method comprises:
generating a first message that triggers a first network device to determine a phase difference, wherein the phase difference is between a first switching time of one of a plurality of first buffers of a first egress port of the first network device and a second switching time of one of a plurality of second buffers of a second egress port of the second network device with a link delay taken into consideration, and wherein the link delay is from the second network device to the first network device; and
sending the first message to the first network device via the second egress port, wherein a first switching cycle for the first buffers is the same as a second switching cycle for the second buffers, wherein the first buffers are cyclically scheduled by the first network device, and wherein the second buffers are cyclically scheduled by the second network device.

11. The packet forwarding method of claim 10, further comprising:
generating a second message comprising a first time and a second time, wherein the first time is at which the second network device sends the first message, wherein the second time is a third switching time of a third buffer in the second buffers that is scheduled when the first message is sent, and wherein the third switching time is earlier than the first time; and
sending, to the first network device via the second egress port, the second message.

12. The packet forwarding method of claim 11, wherein the first message comprises a first identifier for identifying the first message, wherein the second message comprises a second identifier for identifying the second message, and wherein the first identifier corresponds to the second identifier.

13. The packet forwarding method of claim 10, further comprising:
generating a second message comprising a time difference between a first time and a second time, wherein the first time is at which the second network device sends the first message, wherein the second time is a third switching time of a third buffer in the second buffers that is scheduled when the first message is sent, and wherein the third switching time is earlier than the first time; and
sending, to the first network device via the second egress port, the second message.

14. A first network device comprising:
a non-transitory memory configured to store instructions; and
a processor coupled to the non-transitory memory, wherein the instructions, when executed by the processor, cause the first network device to:
receive a first message from a second network device via a second egress port of the second network device, wherein the first message measures a phase difference, wherein the phase difference is between a first switching time of one of a plurality of first buffers of a first egress port of the first network device and a second switching time of one of a plurality of second buffers of the second egress port with a link delay taken into consideration, and wherein the link delay is from the second network device to the first network device;
determine, based on the first message, the phase difference, wherein a first switching cycle for the first buffers is the same as a second switching cycle for the second buffers, wherein the first buffers are cyclically scheduled by the first network device, and wherein the second buffers are cyclically scheduled by the second network device;
receive, from the second egress port, a first data packet;
obtain, based on the first data packet, a second data packet; and
schedule, based on the phase difference, the second data packet to send via the first network device.

15. The first network device of claim 14, wherein the instructions, when executed by the processor, further cause the first network device to:
receive a second message from the second network device, wherein the second message comprises a first time difference before determining the phase difference, wherein the first time difference is between a first time and a second time, wherein the first time is at which the second network device sends the first message, wherein the second time is a third switching time of a third buffer in the second buffers that is scheduled when the first message is sent, and wherein the third switching time is earlier than the first time; and further determine, based on the second message, the phase difference.

16. The first network device of claim 14, wherein the instructions, when executed by the processor, further cause the first network device to:
receive, from the second network device, a second message comprising a first time and a second time before determining the phase difference, wherein the first time is at which the second network device sends the first message, wherein the second time is a third switching time of a third buffer in the second buffers that is scheduled when the first message is sent, and wherein the third switching time is earlier than the first time; and
further determine, based on the second message, the phase difference.

17. The first network device of claim 16, wherein the instructions, when executed by the processor, further cause the first network device to:
determine a third time at which the first message is received;
determine, based on the third time, a fourth time that is a fourth switching time of a corresponding fourth buffer in the first buffers that is scheduled when the first message is received, wherein the fourth switching time is later than the third time; and
further determine, based on the fourth time, the phase difference, wherein a first value of the phase difference is equal to a difference between the first switching cycle and a second value, wherein the second value is equal to a third value returned by a modulo operation of a fourth value on the first switching cycle, and wherein the fourth value is equal to a sum of a first time difference between the first time and the second time and a second time difference between the fourth time and the third time.

18. The first network device of claim 16, wherein the first message comprises a first identifier for identifying the first message, wherein the second message comprises a second identifier for identifying the second message, and wherein the first identifier corresponds to the second identifier.

19. The first network device of claim 14, wherein the first message comprises a first time difference between a first time and a second time, wherein the first time is at which the second network device sends the first message, wherein the second time is a third switching time of a third buffer in the second buffers that is scheduled when the first message is sent, and wherein the third switching time is earlier than the first time.

20. The first network device of claim 14, wherein the first message comprises a first time at which the second network device sends the first message and a second time that is a third switching time of a third buffer in the second buffers, and wherein the third switching time is earlier than the first time.

21. The first network device of claim 20, wherein the instructions, when executed by the processor, further cause the first network device to:
determine a third time at which the first message is received;
determine, based on the third time, a fourth time that is a fourth switching time of a corresponding fourth buffer in the first buffers that is scheduled when the first message is received, and wherein the fourth switching time is later than the third time; and further determine, based on the fourth time, the phase difference, wherein a first value of the phase difference is equal to a first difference between the first switching cycle and a second value, wherein the second value is equal to a third value returned by a modulo operation of a fourth value on the first switching cycle, and wherein the fourth value is equal to a sum of a first time difference between the first time and the second time and a second time difference between the fourth time and the third time.

22. The first network device of claim 14, wherein the instructions, when executed by the processor, further cause the first network device to:
determine, based on the phase difference and a processing delay, a corresponding third buffer for the second data packet, wherein the first buffers comprise the corresponding third buffer, and wherein the processing delay is when determining the second data packet based on the first data packet;
store, in the corresponding third buffer, the second data packet; and
send the second data packet via the first egress port during a cycle that is after storing the second data packet and scheduling the corresponding third buffer.

23. A second network device comprising:
a non-transitory memory configured to store instructions; and
a processor coupled to the non-transitory memory, wherein the instructions, when executed by the processor, cause the second network device to:
generate a first message that triggers a first network device to determine a phase difference, wherein the phase difference is between a first switching time of one of a plurality of first buffers of a first egress port of the first network device and a second switching time of one of a plurality of second buffers of the second network device with a link delay taken into consideration, wherein the link delay is from the second network device to the first network device; and
send the first message to the first network device, wherein a first switching cycle for the first buffers is the same as a second switching cycle for the second buffers, wherein the first buffers are cyclically scheduled by the first network device, and wherein the second buffers are cyclically scheduled by the second network device.

24. The second network device of claim 23, wherein the instructions, when executed by the processor, further cause the second network device to:
generate a second message comprising a first time and a second time, wherein the first time is at which the second network device sends the first message, wherein the second time is a third switching time of a third buffer in the second buffers that is scheduled when the first message is sent, and wherein the third switching time is earlier than the first time; and
send, to the first network device, the second message.

25. The second network device of claim 24, wherein the first message comprises a first identifier for identifying the first message, wherein the second message comprises a second identifier for identifying the second message, and wherein the first identifier corresponds to the second identifier.

26. The second network device of claim 23, wherein the instructions, when executed by the processor, further cause the second network device to:

generate a second message comprising a time difference between a first time and a second time, wherein the first time is at which the second network device sends the first message, wherein the second time is a third switching time of a third buffer in the second buffers that is scheduled when the first message is sent, and wherein the third switching time is earlier than the first time; and send, to the first network device, the second message.

* * * * *